United States Patent
Yoon et al.

(10) Patent No.: US 10,230,999 B2
(45) Date of Patent: *Mar. 12, 2019

(54) SIGNAL TRANSMISSION/RECEPTION DEVICE AND SIGNAL TRANSMISSION/RECEPTION METHOD FOR PROVIDING TRICK PLAY SERVICE

(71) Applicant: LG ELECTRONICS INC., Seoul (KR)

(72) Inventors: Joonhee Yoon, Seoul (KR); Soojin Hwang, Seoul (KR); Jongyeul Suh, Seoul (KR); Hyunmook Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 252 days.

This patent is subject to a terminal disclaimer.

(21) Appl. No.: 15/101,320

(22) PCT Filed: Dec. 16, 2014

(86) PCT No.: PCT/KR2014/012385
§ 371 (c)(1),
(2) Date: Jun. 2, 2016

(87) PCT Pub. No.: WO2015/093811
PCT Pub. Date: Jun. 25, 2015

(65) Prior Publication Data
US 2017/0272787 A1    Sep. 21, 2017

Related U.S. Application Data

(60) Provisional application No. 61/916,757, filed on Dec. 16, 2013, provisional application No. 61/954,615, (Continued)

(51) Int. Cl.
*H04N 21/236* (2011.01)
*H04N 21/84* (2011.01)
(Continued)

(52) U.S. Cl.
CPC ....... *H04N 21/236* (2013.01); *H04N 21/2387* (2013.01); *H04N 21/23614* (2013.01);
(Continued)

(58) Field of Classification Search
CPC ......... H04N 21/23614; H04N 21/2387; H04N 21/236; H04N 21/4147; H04N 21/84;
(Continued)

(56) References Cited

U.S. PATENT DOCUMENTS

2008/0219393 A1    9/2008 Toma et al.
2009/0220012 A1*   9/2009 Rodriguez .............. H04N 5/76
                                                   375/240.25
(Continued)

FOREIGN PATENT DOCUMENTS

EP    3076676 A1    10/2016
JP    2007-535187 A 11/2007
(Continued)

OTHER PUBLICATIONS

Gary J. Sullivan, Overview of the High Effciency Video Coding (HEVC) Standard,Dec. 2012.*
(Continued)

*Primary Examiner* — Md N Haque
(74) *Attorney, Agent, or Firm* — Birch, Stewart, Kolasch & Birch, LLP

(57) ABSTRACT

The present invention relates to a device for transmitting and receiving a signal and a method for transmitting and receiving a signal. One embodiment of the present invention provides a method for transmitting a signal, comprising the steps of: encoding video source data and outputting video
(Continued)

data including a supplemental enhancement information (SEI) message having group of pictures (GOP) metadata; and transmitting the video data. According to the embodiment of the present invention, a trick play for an encoded stream can be more efficiently provided.

5 Claims, 32 Drawing Sheets

Related U.S. Application Data filed on Mar. 18, 2014, provisional application No. 61/970,910, filed on Mar. 27, 2014.

(51) Int. Cl.
*H04N 21/854* (2011.01)
*H04N 21/2387* (2011.01)
*H04N 21/4147* (2011.01)

(52) U.S. Cl.
CPC ......... *H04N 21/4147* (2013.01); *H04N 21/84* (2013.01); *H04N 21/854* (2013.01)

(58) Field of Classification Search
CPC .. H04N 21/854; H04N 19/114; H04N 19/177; H04N 21/434
See application file for complete search history.

(56) References Cited

U.S. PATENT DOCUMENTS

| | | | |
|---|---|---|---|
| 2009/0323822 A1 | 12/2009 | Rodriguez et al. | |
| 2011/0219063 A1 | 9/2011 | Park et al. | |
| 2012/0023249 A1* | 1/2012 | Chen | H04N 21/235 709/231 |
| 2013/0176387 A1 | 7/2013 | Suh et al. | |
| 2013/0209063 A1 | 8/2013 | Suh et al. | |
| 2013/0308926 A1 | 11/2013 | Jang et al. | |
| 2015/0063790 A1* | 3/2015 | Rodriguez | G11B 27/005 386/351 |
| 2015/0092836 A1 | 4/2015 | Kang et al. | |

FOREIGN PATENT DOCUMENTS

| | | |
|---|---|---|
| JP | 2008-294612 A | 12/2008 |
| JP | 2013-542648 A | 11/2013 |
| KR | 10-2004-0106413 A | 12/2004 |
| KR | 10-2011-0101512 A | 9/2011 |
| KR | 10-2013-0098184 A | 9/2013 |
| KR | 10-2013-0129080 A | 11/2013 |
| WO | WO 2011/111987 A3 | 9/2011 |
| WO | WO 2012/050405 A2 | 4/2012 |
| WO | WO 2013/157826 A1 | 10/2013 |

OTHER PUBLICATIONS

"3rd Generation Partnershtp Project; Technical Specification Group Services and System Aspects; Evaluation of HEVC for 3GPP Services (Retease 12)," 3GPP TR 26.9xx, V0.0.2, XP050687662, Feb. 2013, pp. 1-15.

Hannuksela, "Signaling of Enhanced GOPs," Joint Video Team (JVT) of ISO/IEC MPEG & ITU-T VCEG (ISO/IEC JTC1/SC29/WG11 and ITU-T SG16 Q.6), 4th Meeting, Klagenfurt, Austria, Jul. 22-26, 2002, JVT-D098, pp. 1-6 (7 pages total).

"Digital Video Broadcasting (DVB); Specification for the Use of Video and Audio Coding in Broadcasting Applications Based on the MPEG-2 Transport Stream," ETSI DRAFT, ETSI TS 101 154, V2.1.1, Oct. 2014, pp. 1-226.

Choi et al., "AHG9: On Random Access Point Pictures," Joint Collaborative Team on Video Coding (JCT-VC) of ITU-T SG 16 WP 3 and ISO/IEC JTC 1/SC 29/WG 11, Document: JCTVC-K0208, 11th Meeting, Shanghai, China, Oct. 10-19, 2012, pp. 1-6 (7 pages total).

Hendry et al., "AHG9: On Non-Referenced TSA and STSA NAL Units," Joint Collaborative Team on Video Coding (JCT-VC) of ITU-T SG 16 WP 3 and ISO/IEC JTC 1/SC 29/WG 11, Document: JCTVC-K0164, 11th Meeting, Shanghai, China, Oct. 10-19, 2012, pp. 1-7 (8 pages total).

* cited by examiner

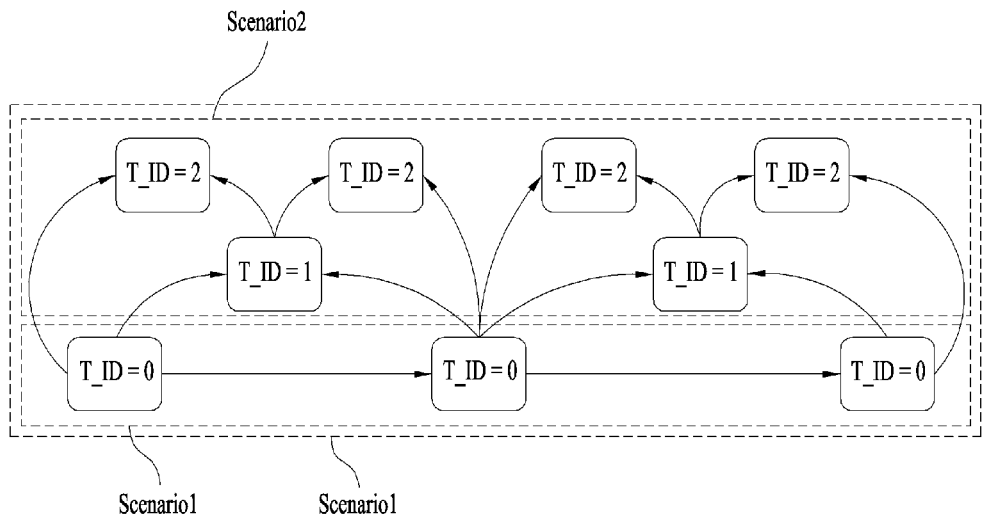

| NL0 | NL1 | NL2 | ... | Format Req | Specification | Description |
|---|---|---|---|---|---|---|
| moov | | | | | [ISO] 8.2.1 | Container for functional metadata |
| | mvhd | | | | [ISO] 8.2.2 | movie header |
| | meta | | | | [ISO] 8.11.1 | DECE Required matadata |
| | | xml | | | Section 2.3.4.1 | XML for required matadata |
| moof | | | | + | [ISO] 8.8.4 | Movie Fragment |
| | mfhd | | | 1 | [ISO] 8.8.5 | Movie Fragment Header |
| | traf | | | 1 | [ISO] 8.8.6 | Track Fragment |
| | | tfhd | | 1 | [ISO] 8.8.7 | Track Fragment Header |
| | | tfdt | | 0/1 | [ISO] 8.8.12 | Track Fragment Base Media Decode Time |
| | | trik | | 1 for video 0 for others | Section 2.2.7 | Trick Play Box |
| | | trickhvc | | 1 for video 0 for others | | Trick Play Box |
| | | turn | | 1 | [ISO] 8.8.8 | Track Fragment Run Box |
| | | avcn | | 0/1 for video 0 for others | Section 2.2.2 | AVC NAL Unit Storage Box |
| | | hvcn | | 0/1 for video 0 for others | | HEVC NAL Unit Storage Box |
| ... | ... | ... | | ... | ... | ... |

FIG. 3

```
Syntax
aligned(8) class HEVCNALBox
              extends Box('hvcn')
{
              HEVCDecoderConfigurationRecord()HEVCConfig:
}
```

FIG. 4

| Element | Definition | Value | Card |
|---|---|---|---|
| HighDynamicRange | | xs:string | 0..1 |

FIG. 5

| Random access point pictures | IDR | Instantaneous decoding refresh | Without associated leading picture |
| --- | --- | --- | --- |
| | | | May have associated leading picture |
| | BLA | Broken link access | Without associated leading picture |
| | | | May have associated RADL pictures but without associated RASL pictures |
| | | | May have associated RADL and RASL |
| | CRA | Clean random access | |
| Leading picture | RADL | Random access decodable leading picture | |
| | RASL | Random access skipped leading picture | Not-used for reference in the same sub-layer |
| Temporal sub-layer access pictures | TSA | Temporal sub-layer access | May be used for reference in the same sub-layer |
| | | | Not-used for reference in the same sub-layer |
| | STSA | Step-wise temporal sub-layer access | May be used for reference in the same sub-layer |
| | | | Not-used for reference in the same sub-layer |
| Non-constrained | | | May be used for reference in the same sub-layer |
| | | | Not-used for reference in the same sub-layer |

FIG. 10

```
aligned(8) class TrickPlayBox
            extends Fullbox('trikhvc', version=0, flags=0)
{
            for (i=0; I<sample_count, i++){
                        unsigned int(4) pic_type;
                        unsigned int(6) dependency_level;
                        unsigned int(6) reserved;
            }
}
```

FIG. 11

```
aligned(8) class TrickPlayBox
            extends Fullbox('trik', version=0, flag)
{
            if (flags=0)
                        for (i=0; i<sample_count, i++){
                                    unsigned int(2) pic_type;
                                    unsigned int(6) dependency_level;
                        }
            else
                        for (i=0; i<sample_count, i++){
                                    unsigned int(4) pic_type;
                                    unsigned int(6) dependency_level;
                                    unsigned int(6) reserved;
                        }
}
```

FIG. 12

| pic_type | Description | Reference(nal_unit_type) |
|---|---|---|
| 0 | IDR without associated leading picture | IDR_N_LP |
| 1 | DR with Decodable Leading Picture | IDR_W_RADL |
| 2 | BDR with Decodable Leading Picture | BLA_N_LP |
| 3 | BLA may have associated RADL pictures but without associated RASL pictures | BLA_W_RADL |
| 4 | BLA may have associated RADL and RASL | BLA_W_LP |
| 5 | CRA may have associated leading pictures | CRA_NUT |
| 7 | Random access decodable leading picture | RADL_N, RADL_R |
| 8 | Random access skipped leading picture | RASL_N, RASL_R |
| 9 | Unconstrained I-picture | |
| 10 | Unknown | |
| 11~15 | Reserved | |

FIG. 13

```
aligned(8) class TrickPlayBox
            extends Fullbox('trikhvc', version=0, flags=0)
{
            for (i=0; i<sample_count, i++){
                        unsigned int(3) pic_type;
                        unsigned int(5) dependency_level;
            }
}
```

```
aligned(8) class TrickPlayBox
            extends Fullbox('trik', version=0, flags)
{
            if (flags=0)
                        for (i=0; i<sample_count, i++){
                                    unsigned int(2) pic_type;
                                    unsigned int(6) dependency_level;
                        }
            else
                        for (i=0; i<sample_count, i++){
                                    unsigned int(3) pic_type;
                                    unsigned int(5) dependency_level;
                        }
}
```

FIG. 16

```
aligned(8) class TrickPlayBox
            extends Fullbox('trikhvc', version=0, flags=0)
{
            for (i=0; i<sample_count, i++){
                        unsigned int(4) pic_type;
                        unsigned int(2) temporal_sub_layer_pic_type;
                        unsigned int(3) max_temporal_id;
                        unsigned int(3) temporal_id;
                        unsigned int(3) constraint_trick_play_mode;
                        unsigned int(1) reserved;
                        if (temporal_sub_layer_pic_type = 'TSA'){
                                    unsigned int(3) next_temporal_id;
                                    unsigned int(5) reserved;
                        }
                        else if (temporal_sub_layer_pic_type = 'STSA'){
                                    unsigned int(3) next_temporal_id;
                                    unsigned int(5) reserved;
                        }
            }
}
```

FIG. 17

```
aligned(8) class TrickPlayBox
            extends Fullbox('trik', version=0, flags)
{
            if (flags=0)
                    for (i=0; I<sample_count, i++){
                            unsigned int(2) pic_type;
                            unsigned int(6) dependency_level;
                    }
            else
                    for (i=0; I<sample_count, i++){
                            unsigned int(4) pic_type;
                            unsigned int(2) temporal_sub_layer_pic_type;
                            unsigned int(3) max_temporal_id;
                            unsigned int(3) temporal_id;
                            unsigned int(3) constraint_trick_play_mode;
                            unsigned int(1) reserved;
                            if (temporal_sub_layer_pic_type = 'TSA'){
                                    unsigned int(3) next_temporal_id;
                                    unsigned int(5) reserved;
                            }
                            else if (temporal_sub_layer_pic_type = 'STSA'){
                                    unsigned int(3) next_temporal_id;
                                    unsigned int(5) reserved;
                            }
                    }
}
```

FIG. 20

```
aligned(8) class TrickPlayBox
            extends Fullbox('trikhvc', version=0, flags=0)
{
            for (i=0; I<sample_count, i++){
                        unsigned int(4) pic_type;
                        unsigned int(2) temporal_sub_layer_pic_type;
                        unsigned int(3) max_temporal_id;
                        unsigned int(3) temporal_id;
                        if (temporal_sub_layer_pic_type = 'TSA'){
                                    unsigned int(3) next_temporal_id;
                                    unsigned int(5) reserved;
                        }
                        else if (temporal_sub_layer_pic_type = 'STSA'){
                                    unsigned int(3) next_temporal_id;
                                    unsigned int(5) reserved;
                        }
                        unsigned int(6) dependency_level;
            }
}
```

FIG. 21

```
aligned(8) class TrickPlayBox
            extends Fullbox('trik', version=0, flags)
{
            if (flags=0)
                        for (i=0; I<sample_count, i++){
                                    unsigned int(2) pic_type;
                                    unsigned int(6) dependency_level;
                        }
            else
                        for (i=0; I<sample_count, i++){
                                    unsigned int(4) pic_type;
                                    unsigned int(2) temporal_sub_layer_pic_type;
                                    unsigned int(3) maxtemporal_id;
                                    unsigned int(3) temporal_id;
                                    if (temporal_sub_layer_pic_type = 'TSA'){
                                                unsigned int(3) next_temporal_id;
                                                unsigned int(5) reserved;
                                    }
                                    else if (temporal_sub_layer_pic_type = 'STSA'){
                                                unsigned int(3) next_temporal_id;
                                                unsigned int(5) reserved;
                                    }
                                    unsigned int(6) dependency_level;
                        }
}
```

| nuh_temporal_id_plus1 | tier |
|---|---|
| 1 | 1 |
| 2 | 2 |
| 3 | 3 |
| 4 | 4 |

| nuh_temporal_id_plus1 | tier |
|---|---|
| 1 | 1 |
| 2 | 2 |
| 3 | 3 |
| 4 | 6 |

FIG. 29

| data_field_tag | Description |
|---|---|
| 0 x 00 | Reserved |
| 0 x 01 | Announcement switching data field |
| 0 x 02 | AU_information data field |
| 0 x 03 | PVR_assist_information data field |
| 0 x 04 | TSAP time line data field |
| 0 x 05 | HEVC temporal id tier mapping info data field |
| 0 x 06 to 0x9F | Reserved for future use |
| 0 x A0 to 0xFF | User defined |

FIG. 30

| Syntax | No. of bits | Format |
|---|---|---|
| HEVC_temporal_id_tier_mapping_info (payloadSize) { | | |
|   reserved | 6 | |
|   included_temporal_id_flag | 1 | |
|   temporal_sub_layer_dependency_flag | 1 | |
|   if(included_temporal_id_flag & temporal_sub_layer_dependency_flag){ | | |
|     max_temporal_id_plus1 | 3 | |
|     temporal_id_plus1 | 3 | |
|     reserved | 2 | |
|     if(max_temporal_id_plus1 > 1){ | | |
|       for(i=0; i<max_temporal_id_plus1 – 1; i++){ | 3 | |
|         curr_tier_num | 3 | |
|         trick_play_speed | 2 | |
|         reserved | | |
|       } | | |
|     } | | |
|   } | | |
| } | | |

FIG. 31

| trick play speed | Providable X speed |
|---|---|
| 0 | 1 |
| 1 | 2 |
| 2 | 4 |
| 3 | 8 |
| 4 | 16 |
| 5 | 32 |
| 6 | 64 |

FIG. 32

| Syntax | No. bits | Mnemonic |
|---|---|---|
| PVR_assist_information( ) { | | |
|   data_field_tag | 8 | uimsbf |
|   data_field_length | 8 | uimsbf |
|   if (data_field_length > 0) { | | |
|     PVR_assist_tier_pic_num | 3 | uimsbf |
|     PVR_assist_block_trick_mode_present_flag | 1 | bsibf |
|     PVR_assist_pic_struct_present_flag | 1 | bsibf |
|     PVR_assist_tier_next_pic_in_tier_present_flag | 1 | bsibf |
|     PVR_assist_substream_info_present_flag | 1 | bsibf |
|     PVR_assist_extension_present_flag | 1 | bsibf |
|     if (PVR_assist_extension_present_flag == "1"){ | | |
|       PVR_assist_segmentation_info_present_flag | 1 | bsibf |
|       PVR_assist_tier_m_cumulative_frames_present_flag | 1 | bsibf |
|       PVR_assist_tier_n_mmco_present_flag | 1 | bsibf |
|       PVR_assist_reserved_0 | 5 | "00000" |
|       if (PVR_assist_segmentation_info_present_flag == "1"){ | | |
|         PVR_assist_seg_id | 8 | uimsbf |
|         PVR_assist_prg_id | 16 | uimsbf |
|         PVR_assist_seg_start_flag | 1 | bsibf |
|         PVR_assist_seg_end_flag | 1 | bsibf |
|         PVR_assist_prg_start_flag | 1 | bsibf |
|         PVR_assist_prg_stop_flag | 1 | bsibf |
|         PVR_assist_scene_change_flag | 1 | bsibf |
|         PVR_assist_reserved_0 | 3 | "000" |
|       } | | |
|       if (PVR_assist_tier_m_cumulative_frames_present_flag == "1"){ | | |
|         PVR_assist_tier_m | 3 | uimsbf |
|         PVR_assist_tier_m_cumulative_frames | 5 | uimsbf |
|       } | | |
|       if (PVR_assist_tier_n_mmco_present_flag == "1") { | | |
|         PVR_assist_tier_n_mmco | 3 | uimsbf |
|         PVR_assist_reserved_0 | 5 | "00000" |
|       } | | |
|     } | | |
|   } | | |

FIG. 33

| Syntax | No. bits | Mnemonic |
|---|---|---|
| PVR_assist_information( ) { | | |
|    data_field_tag | 8 | uimsbf |
|    data_field_length | 8 | uimsbf |
|    if (data_field_length > 0) { | | |
|      PVR_assist_tier_pic_num | 3 | uimsbf |
|      PVR_assist_temporal_id_plus1 | 3 | uimsbf |
|      PVR_assist_block_trick_mode_present_flag | 1 | bsibf |
|      PVR_assist_pic_struct_present_flag | 1 | bsibf |
|      PVR_assist_tier_next_pic_in_tier_present_flag | 1 | bsibf |
|      PVR_assist_substream_info_present_flag | 1 | bsibf |
|      PVR_assist_extension_present_flag | 1 | bsibf |
|      PVR_assist_temporal_id_info_present_flag | 1 | bsibf |
| | | |
|      if(PVR_assist_temporal_id_info_present_flag == "1") { | | |
|         PVR_assist_max_temporal_id_plus1 | 3 | uimsbf |
|      } | | |
|    } | | |
| } | | |

FIG. 34

| Syntax | No. bits | Mnemonic |
|---|---|---|
| PVR_assist_information( ) { | | |
|     data_field_tag | 8 | uimsbf |
|     data_field_tag | 8 | uimsbf |
|     if (data_field_length > 0) { | | |
|         PVR_assist_tier_pic_num | 3 | uimsbf |
|         PVR_assist_tier_pic_num_to_temporal_id_flag | 3 | bsibf |
|         PVR_assist_block_trick_mode_present_flag | 1 | bsibf |
|         PVR_assist_pic_struct_present_flag | 1 | bsibf |
|         PVR_assist_tier_next_pic_in_tier_present_flag | 1 | bsibf |
|         PVR_assist_substream_info_present_flag | 1 | bsibf |
|         PVR_assist_extension_present_flag | 1 | bsibf |
|         PVR_assist_temporal_id_info_present_flag | 1 | bsibf |
| | | |
|         if (PVR_assist_tier_pic_num_to_temporal_id_flag == 1 && PVR_assist_temporal_id_info_present_flag == "1") { | | |
|             PVR_assist_max_temporal_id_plus1 | 3 | uimsbf |
|         } | | |
|     } | | |
| } | | |

FIG. 35

| Syntax | No. bits | Mnemonic |
|---|---|---|
| PVR_assist_information( ) { | | |
| data_field_tag | 8 | uimsbf |
| data_field_length | 8 | uimsbf |
| if (data_field_length > 0) { | | |
|    PVR_assist_temporal_id_plus1 | 3 | uimsbf |
| | | |
|    PVR_assist_substream_info_present_flag | 1 | bsibf |
|    PVR_assist_extension_present_flag | 1 | bsibf |
|    PVR_assist_temporal_id_present_flag | 1 | bsibf |
|    PVR_assist_temporal_sub_layer_dependency_flag | 1 | bsibf |
| | | |
|    if (PVR_assist_temporal_id_present_flag == "1" && PVR_assist _temporal_sub_layer_dependency_flag == "1") { | | |
|       PVR_assist_max_temporal_id_plus1 | 3 | uimsbf |
|       If(PVR_assist_max_temporal_id_plus1> 1) { | | |
|          for(i=0; i<PVR_assist_max_temporal_id_plus1 – 1; i++) { | 3 | |
|             PVR_assist_curr_tier_num | 3 | uimsbf |
|             PVR_assist_trick_play_speed | 3 | uimsbf |
|             PVR_assist_reserved_0 | 2 | "00" |
|          } | | |
|       } | | |
|    } | | |
| } | | |
| } | | |

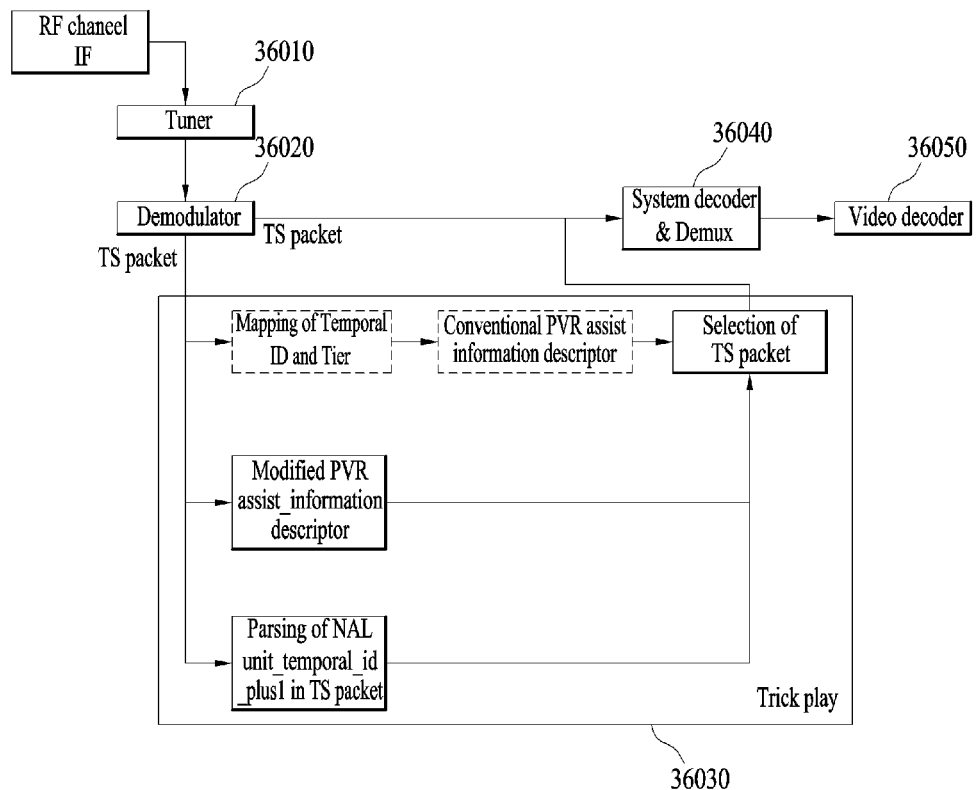

FIG. 38

| Syntax | No. bits | Mnemonic |
|---|---|---|
| PVR_assist_information( ) { | | |
|     data_field_tag | 8 | uimsbf |
|     data_field_length | 8 | uimsbf |
|     if (data_field_length > 0) { | | |
|         ......... | | |
|         PVR_assist_temporal_id_plus1 | 3 | uimsbf |
|         PVR_assist_temporal_id_info_present_flag | 1 | bsibf |
|         PVR_assist_intra_picture_flag | 1 | bsibf |
|         PVR_assist_reserved_0 | 3 | "000" |
|         If(PVR_assist_temporal_id_info_present_flag == "1") { | | |
|             PVR_assist_max_temporal_id_plus1 | 3 | uimsbf |
|             PVR_assist_PB_numbers_in_temporalId_zero | 3 | uimsbf |
|             PVR_assist_reserved_0 | 2 | "00000" |
|         } | | |
|         for (i=0; i<n; i+) + { | | |
|             PVR_assist_reserved_byte | 8 | uimsbf |
|         } | | |
|     } | | |
| } | | |

FIG. 44

| sei_payload( payloadType, payloadSize ) { | Descriptor |
|---|---|
| ... | |
|   if( payloadType == xxx ) | |
|     trickplay_service_GOP_metadata_info( payloadSize ) | |

| Syntax | No. of bits | Format |
|---|---|---|
| trickplay_service_GOP_metadata_info (payloadSize) { | | |
|   GOP_total_count | 16 | uimsbf |
|   GOP_size | 8 | uimsbf |
|   max_temporal_ID | 3 | uimsbf |
|   for(i=0; i<GOP_size; i++) { | | |
|     temporal_ID | 3 | uimsbf |
|     picture_type | 4 | uimsbf |
|     temporal_sub_layer_picture_type | 3 | uimsbf |
|     dependency_level | 6 | uimsbf |
|     reserved | 5 | uimsbf |
|   } | | |
| } | | |

FIG. 45

| pic_type | Description | Reference (nal_unit_type) |
|---|---|---|
| 0 | IDR without associated leading picture | IDR_N_LP |
| 1 | IDR with Decodable Leading Picture | IDR_W_RADL |
| 2 | BLA without associated leading picture | BLA_N_LP |
| 3 | BLA may have associated RADL pictures but without associated RASL pictures | BLA_W_RADL |
| 4 | BLA may have associated RADL and RASL | BLA_W_LP |
| 5 | CRA may have associated leading pictures | CRA_NUT |
| 6 | Random access decodable leading picture | RADL_N, RADL_R |
| 7 | Random access skipped leading picture | RASL_N, RASL_R |
| 8 | Unconstrained I-picture. | |
| 9 | Unknown. | |
| 10 ~ 15 | Reserved | |

FIG. 47
| sub_layer_pic_type | Description |
|---|---|
| 0 | This sample is a reference TSA(Temporal sub-layer access) picture |
| 1 | This sample is a non-reference TSA(Temporal sub-layer access) picture |
| 2 | This sample is a reference STSA(Step-wise temporal sub-layer access) picture |
| 3 | This sample is a non-reference STSA(Step-wise temporal sub-layer access) picture |
| 4 | Unknown picture |
| 5~7 | Reserved |
FIG. 48
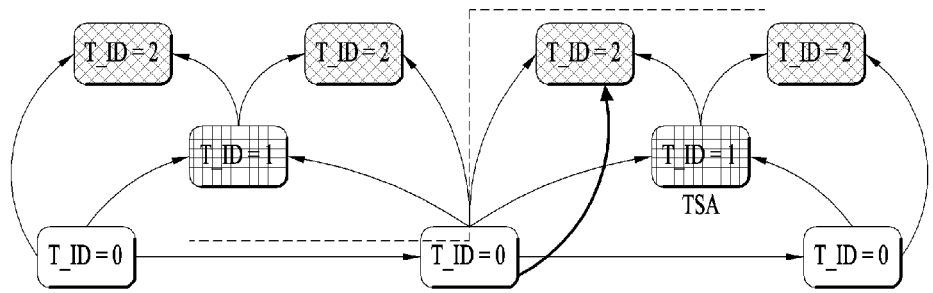
FIG. 49
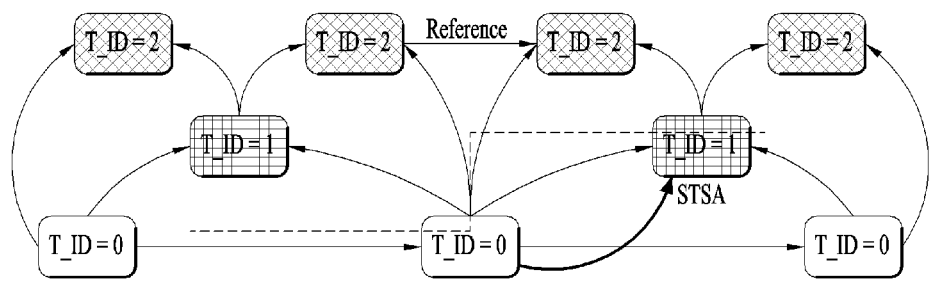

SIGNAL TRANSMISSION/RECEPTION DEVICE AND SIGNAL TRANSMISSION/RECEPTION METHOD FOR PROVIDING TRICK PLAY SERVICE

CROSS REFERENCE TO RELATED APPLICATIONS

This application is the National Phase of PCT International Application No. PCT/KR2014/012385, filed on Dec. 16, 2014, which claims priority under 35 U.S.C. 119(e) to U.S. Provisional Application No. 61/916,757, filed on Dec. 16, 2013; 61/954,615, filed on Mar. 18, 2014; and 61/970,910, filed on Mar. 27, 2014, all of which are hereby expressly incorporated by reference into the present application.

TECHNICAL FIELD

The present invention relates to a signal transmission/reception device and a signal transmission/reception method.

BACKGROUND ART

With the development of digital technology and communication technology, audio/video-based multimedia content has been increasingly distributed and requested in various fields, such as the Internet and personal media, as well as broadcasts and movies. In addition, consumers' demand for realistic media that provide a stereoscopic effect through broadcasts and movies has increased. Furthermore, as the size of TVs for homes is increased together with the development of display technology, consumers' demand for realistic content at a high quality of HD or higher level is increasing. Realistic broadcasts through an Ultra High Definition TV (UHDTV) and a 3DTV have attracted considerable attention as next-generation broadcast service. In particular, an Ultra High Definition (UHD) broadcast service has been increasingly discussed.

UHD broadcast content has higher quality than SD or HD broadcast content. For this reason, the amount of data to be transmitted is relatively large. In order to efficiently transmit such high-quality content, therefore new data compression methods have been developed. In recent years, an HEVC compression method, which is superior to a conventional H.264/AVC compression method, has been commercialized. Consequently, it is necessary to conduct research into a method of utilizing content data encoded using HEVC.

A trick play is possible for conventional encoded content. A trick play means a service providing a function that is capable of reproducing an image after a predetermined time, i.e. enabling random access, as well as an X speed function, such as an X2 speed and an X4 speed.

Conventionally, a trick play function is provided for a media service based on an AVC stream. For example, a trick play is possible for content H.264/AVC-encoded in a conventional Common File Format (CFF) medial file format.

DISCLOSURE

Technical Problem

An object of the present invention devised to solve the problem lies on a signal transmission/reception method and a signal transmission/reception device that are capable of more efficiently providing a trick play of an encoded stream.

Another object of the present invention devised to solve the problem lies on a signal transmission/reception method and a signal transmission/reception device that are capable of transmitting and receiving signaling information for a trick play of a stream based on a standardized encoding scheme, such as an AVC or HEVC stream.

Another object of the present invention devised to solve the problem lies on a signal transmission/reception method and a signal transmission/reception device that are capable of providing an extendable scheme in a case in which a trick play of an encoded steam is signaled.

Another object of the present invention devised to solve the problem lies on a signal transmission/reception method and a signal transmission/reception device that are capable of more efficiently executing a trick play while being compatible with a trick play scheme for HEVC-encoded content.

Another object of the present invention devised to solve the problem lies on a method and/or device for transmitting and receiving a broadcast signal for a trick play of HEVC-based broadcast content and a signal transmission/reception method and a signal transmission/reception device that are capable of defining a file format suitable for an HEVC stream so as to more efficiently provide a trick play.

A further object of the present invention devised to solve the problem lies on a signaling method that is capable of providing maximum X speed information to a user and a signal transmission/reception method and a signal transmission/reception device that are capable of providing a trick play using the temporal scalability of HEVC.

Technical Solution

The object of the present invention can be achieved by providing a signal transmission method including encoding video source data and outputting video data including a Supplemental Enhancement Information (SEI) message having Group of pictures (GOP) metadata, and transmitting the video data.

The GOP metadata may include temporal ID information, picture type information, and temporal sub-layer picture type information.

The picture type information may indicate NAL_unit_type used for a trick play selected from among NAL_unit_types of High Efficiency Video Coding (HEVC), the temporal ID information may correspond to a specific value of NAL_unit_type of HEVC, and temporal sub-layer picture type information may indicate one selected from between a temporal sub-layer access (TSA) picture and a step-wise temporal sub-layer access (STSA) picture of HEVC.

The step of transmitting the video data may include creating a video stream including personal video recorder (PVR) assist information having a maximum temporal identification information value and transmitting the video stream.

In another aspect of the present invention, provided herein is a signal reception method including receiving encoded video data and parsing a Supplemental Enhancement Information (SEI) message of the encoded video data to obtain Group of pictures (GOP) metadata, and decoding the encoded video data based on the obtained Group of pictures (GOP) metadata.

In another aspect of the present invention, provided herein is a signal transmission device including a video encoder for encoding video source data and outputting video data including an SEI message having GOP metadata and a video transmission unit for transmitting the video data.

In another aspect of the present invention, provided herein is a signal reception device including a video parser for receiving encoded video data and parsing an SEI message of the encoded video data to obtain Group of pictures (GOP) metadata and a video decoding unit for decoding the encoded video data based on the Group of pictures (GOP) metadata obtained by the video parser.

In another aspect of the present invention, provided herein is a signal transmission method including encoding video data to create a video stream, wherein the video stream includes personal video recorder (PVR) assist information having a maximum temporal identification information value of the video stream, and transmitting the created video stream.

In a further aspect of the present invention, provided herein is a signal reception device including a demux for demultiplexing a received signal to extract a video stream, wherein the video stream includes personal video recorder (PVR) assist information having a maximum temporal identification information value of the video stream, and a video decoder for decoding the extracted video stream based on the PVR assist information and executing a trick play of the video data.

Advantageous Effects

According to an embodiment of the present invention, it is possible to more efficiently provide a trick play of an encoded stream.

According to an embodiment of the present invention, it is possible to transmit and receive signaling information for a trick play of a stream based on a standardized encoding scheme, such as an AVC or HEVC stream.

According to an embodiment of the present invention, it is possible to provide an extendable scheme in a case in which a trick play of an encoded steam is signaled.

According to an embodiment of the present invention, it is possible to more efficiently execute a trick play while being compatible with a trick play scheme for HEVC-encoded content.

According to an embodiment of the present invention, it is possible to provide a method and/or device for transmitting and receiving a broadcast signal for a trick play of HEVC-based broadcast content and to define a file format suitable for an HEVC stream so as to more efficiently provide a trick play.

According to an embodiment of the present invention, it is possible to provide a signaling method that is capable of providing maximum X speed information to a user and to provide a trick play using the temporal scalability of HEVC.

DESCRIPTION OF DRAWINGS

FIG. 1 is a view showing a signaling method for a trick play according to an embodiment of the present invention based on scenarios.

FIG. 2 is a view showing a Common File Format (CFF) box structure for supporting an HEVC-based stream according to an embodiment of the present invention.

FIG. 3 is a view showing syntax of an "hvcn" box according to an embodiment of the present invention.

FIG. 4 is a view showing an element supporting a High Dynamic Range (HDR) included in Common_Metadata according to an embodiment of the present invention.

FIG. 5 is a view showing a picture type for random access in a case of an HEVC stream according to an embodiment of the present invention.

FIG. 10 is a view showing the configuration of a trick play box for supporting a trick play of an HEVC stream having a max_temporal_id of 0 according to an embodiment of the present invention.

FIG. 11 is a view showing the configuration of a trick play box for supporting a trick play of an HEVC stream having a max_temporal_id of 0 according to another embodiment of the present invention.

FIG. 12 is a view showing the description of pic_type included in a trick play box for supporting a trick play of an HEVC stream having a max_temporal_id of 0 according to an embodiment of the present invention.

FIG. 13 is a view showing the configuration of a trick play box for supporting a trick play of an HEVC stream having a max_temporal_id of 0 in a case in which pic_type does not include contents related to a leading picture according to an embodiment of the present invention.

FIG. 16 is a view showing the configuration of a trick play box for restricting the maximum X speed to support a trick play in an HEVC stream supporting temporal scalability according to an embodiment of the present invention.

FIG. 17 is a view showing the configuration of a trick play box for restricting the maximum X speed to support a trick play in an HEVC stream supporting temporal scalability according to another embodiment of the present invention.

FIG. 20 is a view showing the configuration of a trick play box for supporting a high X speed trick play in an HEVC stream supporting temporal scalability according to an embodiment of the present invention (scenario 3).

FIG. 21 is a view showing the configuration of a trick play box for supporting a high X speed trick play in an HEVC stream supporting temporal scalability according to another embodiment of the present invention.

FIG. 29 is a view showing the configuration of an adaptation field of a TS packet including information for mapping of a temporal id and a tier according to an embodiment of the present invention.

FIG. 30 is a view showing the configuration of HEVC_temporal_id_tier_mapping_info according to an embodiment of the present invention.

FIG. 31 is a view showing the configuration of a trick_play_speed field included in HEVC_temporal_id_tier_mapping_info according to an embodiment of the present invention.

FIG. 32 is a view showing the configuration of PVR_assist_information according to an embodiment of the present invention.

FIG. 33 is a view showing the configuration of PVR_assist_information having a temporal id frame work added thereto according to an embodiment of the present invention.

FIG. 34 is a view showing the configuration of PVR_assist_information having a temporal id frame work added thereto according to another embodiment of the present invention.

FIG. 35 is a view showing the configuration of PVR_assist_information for supporting a trick play using a temporal id according to an embodiment of the present invention.

FIG. 36 is a view showing a receiving apparatus according to an embodiment of the present invention.

FIG. 37 is a view showing comparison between a tier framework and an HEVC temporal sub-layer according to an embodiment of the present invention.

FIG. 38 is a view showing the configuration of PVR_assist_information according to another embodiment of the present invention.

FIG. 44 is a view showing an example of syntax of video data transmitted and received in accordance with an embodiment of the present invention.

FIG. 45 is a view showing picture type information that is capable of supporting a trick play of a video stream according to an embodiment of the present invention.

FIG. 47 is a view showing an example of temporal sublayer picture type according to a temporal_sub_layer_pic_type field among metadata information of a GOP for a trick play according to an embodiment of the present invention.

FIG. 48 is a view showing an example of changing a frame rate for a trick play in a case in which the type of temporal_sub_layer_pic_type information is TSA among metadata information of a GOP for a trick play according to an embodiment of the present invention.

FIG. 49 is a view showing an example of changing a frame rate for a trick play in a case in which the type of temporal_sub_layer_pic_type information is STSA among metadata information of a GOP for a trick play according to an embodiment of the present invention.

BEST MODE

Figure 6:
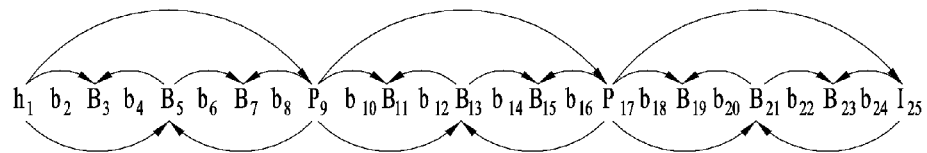
FIG. 6 is a view showing a trick play method in a case of a closed GOP according to an embodiment of the present invention.

For easy understanding of the present invention and the convenience of description, terms and abbreviations are defined as follows.

High Efficiency Video Coding (HEVC) is a high efficiency video coding standard providing the same video quality as a conventional H.265/AVC technology while having a compression rate about twice higher than that of the H.265/AVC technology.

Temporal scalability means a method of coding frames having different frame frequencies in the same spatial resolution A trick play means a function that is capable of reproducing an image after a random time, i.e. enabling random access, and providing an X speed function.

An Open GOP means a structure that is capable of encoding a picture in one GOP using a picture located before the corresponding GOP as a reference picture, i.e. a GOP including a leading picture.

A Closed GOP means a structure for encoding a picture in one GOP using only a picture in the corresponding GOP as a reference picture, i.e. a GOP not including a leading picture unlike the Open GOP.

The leading picture means a picture in HEVC having a later decoding order but an earlier reproduction order than IRAP.

Temporal id is a term introduced to support temporal scalability in HEVC and may be signaled by nuh_temporal_id_plus1 of NAL_unit_header.

Tier is a term introduced to support a trick play in an AVC stream or an mpeg-2 stream and may be included in an adaptation field in a TS packet.

FIG. 1 is a view showing a trick play method according to an embodiment of the present invention based on scenarios.

According to an embodiment of the present invention, a signaling method for a trick play may be defined based on whether to use temporal scalability of HEVC.

In a case in which a video stream according to an embodiment of the present invention is a stream which does not provide temporal scalability, i.e. in a case in which the video stream includes only a picture having a temporal_id of 0, for a Closed GOP, dependency_level and pic_type defined in a CFF media file format may be signaled to provide a trick play since the video stream does not include a leading picture (scenario 1-1). On the other hand, for an Open GOP, leading picture type may be included in pic_type and dependency_level may be signaled to provide a trick play (scenario 1-2).

In a case in which a video stream according to an embodiment of the present invention is a stream based on temporal scalability, i.e. in a case in which the video stream includes a picture having a temporal_id of more than 0, dependency_level, pic_type, and temporal_sub_layer_pic_type may be signaled to provide a trick play. More specifically, a supportable speed level may be signaled through temporal_id included in the stream to provide a trick play (scenario 2). In addition, a supportable X speed level may be signaled through temporal_id in the same manner as in scenario 2 and a picture having a temporal_id of 0 may be additionally used to provide an additional service for X speed (scenario 3).

A box shown in this figure may indicate a picture constituting a video stream and T_ID described in the box may mean temporal_id for supporting temporal scalability.

FIG. 2 is a view showing a Common File Format (CFF) box structure for supporting an HEVC-based stream according to an embodiment of the present invention.

In this figure, NL0", "NL1", and "NL2" may indicate an inclusion relationship of CFF boxes, "Format Req." may indicate existence or nonexistence of corresponding boxes and the number of the corresponding boxes, "Specification" may indicate a portion of standards defining the corresponding boxes, and "Description" may indicate the description of the corresponding boxes. In a case in which "Format Req." is "+", it may mean that one or more corresponding boxes exist. In a case in which "Format Req." is "0/1", it may mean that a corresponding box exists or does not exist. In a case in which "Format Req." is "1", it may mean that a corresponding box exists. In a case in which "Format Req." is "0", it may mean that a corresponding box does not exist.

This figure shows a CFF box structure according to an embodiment of the present invention in which a new trick play box for HEVC is added to a conventional CFF. In addition, a CFF box structure according to an embodiment of the present invention may include a storage box abbreviated to "hvcn" for supporting an HEVC-based nal unit.

FIG. 3 is a view showing syntax of an "hvcn" box according to an embodiment of the present invention.

According to an embodiment of the present invention, a CFF box structure may include a nal unit storage box abbreviated to "hvcn".

According to an embodiment of the present invention, the nal unit storage box may be defined per codec for a trick play.

According to an embodiment of the present invention, the nal unit storage box may not be defined per codec for a trick play and a HEVC trick box different from a conventional AVC trick box may be defined in a conventional "trick" box. In addition, AVC or a HEVC trick play may be selected according to a flag of the "trick" box.

In this figure, HEVCConfig may include a Sequence Parameter Set (SPS) and a Picture Parameter Set (PPS) of HEVC and video information, such as a VUI parameter, of the SPS.

FIG. 4 is a view showing an element supporting a High Dynamic Range (HDR) included in Common_Metadata according to an embodiment of the present invention.

Common_Metadata referred to by an xml box according to an embodiment of the present invention may include a HighDynamicRange element.

A HighDynamicRange element according to an embodiment of the present invention may have a value of string according to an xml schema. One HighDynamicRange element may exist or no HighDynamicRange element may exist.

A HighDynamicRange element according to an embodiment of the present invention may indicate the minimum luminance and/or the maximum luminance (min.luminance and/or max.luminance).

A HighDynamicRange element according to an embodiment of the present invention may profile values classified by the minimum luminance and/or the maximum luminance. For example, the HighDynamicRange element may indicate Conventional capacity (min: 0.1 cd/m2, max: 100 cd/m2), Mid capacity (min: 0.001 cd/m2, max: 1000 cd/m2), or High capacity (min: 0.0001 cd/m2, max: 10000 cd/m2).

FIG. 5 is a view showing a picture type for random access in a case of an HEVC stream according to an embodiment of the present invention.

This figure shows a picture type which may be the base for random access and execution of a trick play among HEVC NAL unit types.

A shaded picture type (TSA, STSA) in this figure may indicate an HEVC temporal sub-layer picture type which may be used for a trick play in a case in which a stream having a temporal ID of more than 0 is included, i.e. temporal scalability is provided. The shaded picture type may be used scenarios 2 and 3 according to an embodiment of the present invention.

According to an embodiment of the present invention, random access point pictures may include an Instantaneous Decoding Refresh (IDR) picture, a Broken Link Access (BLA) picture, and/or a Clean Random Access (CRA) picture, leading pictures may include a Random Access Decodable Leading (RADL) picture and/or a Random Access Skipped Leading (RASL) picture, and temporal sub-layer access pictures may include a Temporal Sub-layer Access (TSA) picture and/or a Step-wise Temporal Sub-layer Access (STSA) picture.

The Instantaneous Decoding Refresh (IDR) picture may include a case in which the IDR picture has a related leading picture and/or a case in which the IDR picture does not have a related leading picture.

The Broken Link Access (BLA) picture may include a case in which the BLA picture has a related RADL picture but does not have a related RASL picture and/or a case in which the BLA picture does not have a related leading picture.

The Clean Random Access (CRA) picture may include a case in which the CRA picture has a related leading picture.

The Temporal Sub-layer Access (TSA) picture may include a case in which the TSA picture is not referred to by the same sub-layer and/or a case in which the TSA picture is referred to by the same sub-layer.

The Step-wise Temporal Sub-layer Access (STSA) picture may include a case in which the STSA picture is not referred to by the same sub-layer and/or a case in which the STSA picture is referred to by the same sub-layer.

FIG. 6 is a view showing a trick play method in a case of a closed GOP according to an embodiment of the present invention (scenario 1-1).

This figure shows a method of executing a trick play in a case in which a maximum temporal_id in a video stream is 0 and in a case of a closed GOP. A GOP is short for a Group Of Pictures and indicates a group of coded pictures for enabling random access. A closed GOP may mean a GIOP which does not include a leading picture and an Open GOP may mean a GIOP which includes a leading picture. The leading picture may indicate a picture in HEVC having a later decoding order but an earlier display order than an Intra Random Access Point (IRAP) (the same concept as a random access point in AVC codec).

In this figure, one quadrilateral box may indicate one picture. A picture may be used as the same meaning as a frame and/or an image.

In this figure, a group of pictures I1 to P9 may indicate one GOP. Picture I, which is one of three picture types used for a MPEG coding signal, may include all data constituting one complete picture. That is, picture I may not refer to other pictures. Picture P may include only a difference value between estimated information obtained by observing a difference between a current picture and the previous picture in presentation order and real information. That is, picture P may refer to a picture existing before a current picture in presentation order. Picture B may include only estimated information obtained by observing a difference among a current picture, the previous picture, and the next picture in presentation order. That is, picture B may refer to pictures existing before and after a current picture. Arrows indicated in this figure may indicate reference among pictures. For example, picture B3 may refer to picture I1 and picture B5 to make a complete picture and picture P9 may refer to picture I1.

In this figure, numbers in the boxes may indicate a dependency_level of each picture. For example, a first picture may indicate a picture having a dependency_level of 1, a second picture may indicate a picture having a dependency_level of 5, and a third picture may indicate a picture having a dependency_level of 4.

According to an embodiment of the present invention, an X2 speed trick play may be executed by decoding pictures having a dependency_level value of 1 to 4. An X4 speed trick play may be executed by decoding pictures having a dependency_level value of 1 to 3. An X8 speed trick play may be executed by decoding pictures having a dependency_level value of 1 or 2. An X16 speed trick play may be executed by decoding pictures having a dependency_level value of 1.

Figure 7:
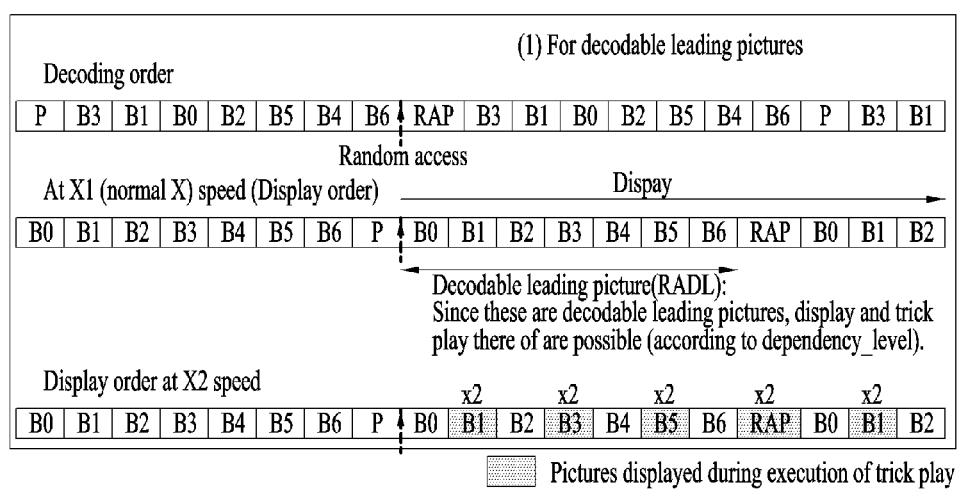
FIG. 7 is a view showing a trick play method in a case of an open GOP wherein the GOP includes a decodable leading picture according to an embodiment of the present invention.

FIG. 7 is a view showing a trick play method in a case of an open GOP wherein the GOP includes a decodable leading picture according to an embodiment of the present invention (scenario 1-2).

A first figure part shows a decoding order of pictures constituting a video stream, a second figure part shows a display order of pictures constituting a video stream at a normal X speed, and a third figure part shows a display order of pictures constituting a video stream during execution of an X2 speed trick play.

In the second figure part, marked pictures B0 to B6 may indicate a decodable leading picture.

Since the leading picture included in the GOP is a decodable leading picture in this figure, pictures may be displayed from a portion indicated by an arrow as shown in the second figure part and a trick play may be executed as shown in the third figure part. In a case in which an X2 speed trick play is executed, pictures B1, B3, B5, RAP, and B1 may be displayed according to a dependency_level of each picture as shown in the figure. A decodable leading picture may include a Random Access Decodable Leading (RADL) picture.

Figure 8:
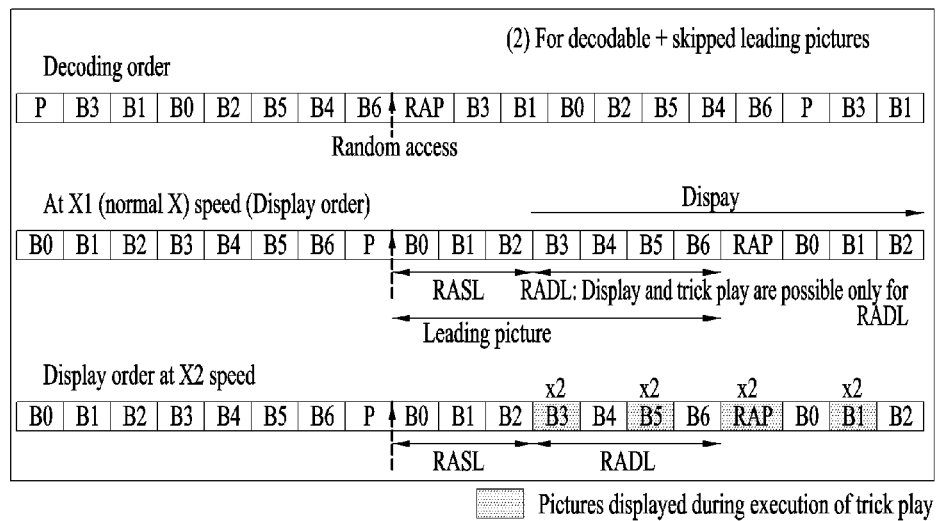
FIG. 8 is a view showing a trick play method in a case of an open GOP wherein the GOP includes a decodable leading picture and a skipped leading picture according to an embodiment of the present invention.

FIG. 8 is a view showing a trick play method in a case of an open GOP wherein the GOP includes a decodable leading picture and a skipped leading picture according to an embodiment of the present invention (scenario 1-2).

A first figure part shows a decoding order of pictures constituting a video stream, a second figure part shows a display order of pictures constituting a video stream at a normal X speed, and a third figure part shows a display order of pictures constituting a video stream during execution of an X2 speed trick play.

In the second and third figure parts, marked pictures B0 to B2 may indicate a skipped leading picture and marked pictures B3 to B6 may indicate a decodable leading picture.

In this figure, a skipped leading picture may not be displayed and a trick play may not be executed. Consequently, pictures may be displayed from picture B3 as shown in the second figure part and a trick play may be executed from picture B3 as shown in the third figure part. In a case in which an X2 speed trick play is executed, pictures B3, B5, RAP, and B1 may be displayed according to a dependency_level of each picture as shown in the figure. A decodable leading picture may include a Random Access Decodable Leading (RADL) picture and a skipped leading picture may include a Random Access Skipped Leading (RASL) picture.

Figure 9:
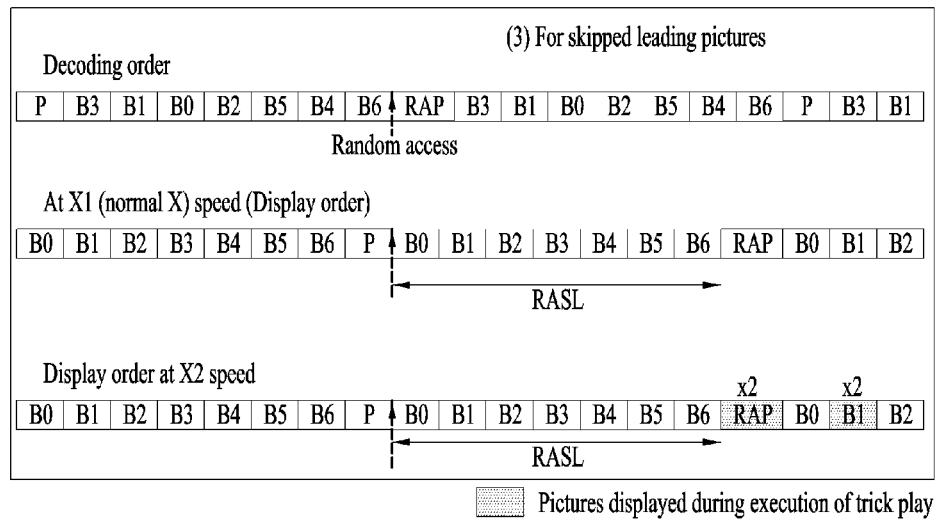
FIG. 9 is a view showing a trick play method in a case of an open GOP wherein the GOP includes a skipped leading picture according to an embodiment of the present invention.

FIG. 9 is a view showing a trick play method in a case of an open GOP wherein the GOP includes a skipped leading picture according to an embodiment of the present invention (scenario 1-2).

A first figure part shows a decoding order of pictures constituting a video stream, a second figure part shows a display order of pictures constituting a video stream at a normal X speed, and a third figure part shows a display order of pictures constituting a video stream during execution of an X2 speed trick play.

In the second and third figure parts, marked pictures B0 to B6 may indicate a skipped leading picture.

In this figure, a skipped leading picture may not be displayed and a trick play may not be executed. Consequently, pictures may be displayed from picture RAP as shown in the second figure part and pictures RAP and B1 may be displayed as shown in the third figure part in a case in which an X2 speed trick play is executed. A skipped leading picture may include a Random Access Skipped Leading (RASL) picture.

FIG. 10 is a view showing the configuration of a trick play box for supporting a trick play of an HEVC stream having a max_temporal_id of 0 according to an embodiment of the present invention (scenario 1-2).

This figure shows a signaling method of a trick play box for executing a trick play of a stream having a maximum temporal_id of 0.

According to an embodiment of the present invention, a new box "trikhvc" may be defined. A trikhvc box according to an embodiment of the present invention may include a pic_type field and/or a dependency_level field in a for loop repeated by a value of sample_count.

Sample_count may mean the total number of pictures included in a stream. One sample may mean one picture.

The pic_type field may mean a picture type defined in NAL_unit_type of HEVC. Some NAL_unit_types which may be used for a trick play may be selected and used as pic_type according to an embodiment of the present invention. The pic_type field may indicate a value of 4 bits.

The dependency_level field may indicate a dependency_level of a corresponding picture. Dependency_level according to an embodiment of the present invention may be used in a case in which a trick play is executed. The dependency_level field may be identical to a dependency_level field used in a conventional trick play box of AVC. For example, execution of a trick play including samples having a dependency_level of 3 may mean decoding and displaying of only samples having a dependency_level of 1, 2, or 3. Consequently, dependency_level may mean a level of a layer which may be discarded in executing a trick play. Even in a case in which a leading picture exists, a decodable leading picture may have a dependency_level and a receiving side may decode and display only corresponding pictures while skipping non-corresponding pictures in the same manner as in a conventional trick play method. The dependency_level field may indicate a value of 6 bits.

FIG. 11 is a view showing the configuration of a trick play box for supporting a trick play of an HEVC stream having a max_temporal_id of 0 according to another embodiment of the present invention (scenario 1-2).

This figure shows a signaling method of a trick play box for executing a trick play of a stream having a maximum temporal_id of 0.

According to an embodiment of the present invention, a trick play of an HEVC stream may be executed using a conventionally defined box "trik". According to an embodiment of the present invention, an AVC or HEVC trick play may be selected using a flag.

A trik box according to an embodiment of the present invention may divide and signal a stream based on video codec using a flag. In addition, the trik box may include a pic_type field and/or a dependency_level field in a for loop repeated by a sample_count value.

In a case in which a value of flag according to an embodiment of the present invention is 0, the trik box may signal an H.264/AVC trick play. In a case in which a value of flag is 1, the trik box may signal an HEVC trick play.

Sample_count may mean the total number of pictures included in a stream. One sample may mean one picture.

The pic_type field may mean a picture type defined in NAL_unit_type of HEVC. Some NAL_unit_types which may be used for a trick play may be selected and used as pic_type according to an embodiment of the present invention. In a case in which a value of flag according to an embodiment of the present invention is 0, the pic_type field may indicate a value of 2 bits. In a case in which a value of flag is 1, the pic_type field may indicate a value of 4 bits.

The dependency_level field may indicate a dependency_level of a corresponding picture. Dependency_level according to an embodiment of the present invention may be used in a case in which a trick play is executed. The dependency_level field may be identical to a dependency_level field used in a conventional trick play box of AVC. For example, execution of a trick play including samples having a dependency_level of 3 may mean decoding and displaying of only samples having a dependency_level of 1, 2, or 3. Consequently, dependency_level may mean a level of a layer which may be discarded in executing a trick play. Even in a case in which a leading picture exists, a decodable leading picture may have a dependency_level and a receiving side may decode and display only corresponding pictures while skipping non-corresponding pictures in the same manner as in a conventional trick play method. The dependency_level field may indicate a value of 6 bits.

FIG. 12 is a view showing the description of pic_type included in a trick play box for supporting a trick play of an HEVC stream having a max_temporal_id of 0 according to an embodiment of the present invention.

Pic_type according to an embodiment of the present invention may have a value of 0 to 15.

In a case in which a value of pic_type is 0, pic_type may indicate an IDR picture which does not have a related leading picture. In this case, nal_unit_type may indicate IDR_N_LP.

In a case in which a value of pic_type is 1, pic_type may indicate an IDR picture which has a related decodable leading picture. In this case, nal_unit_type may indicate IDR_W_RADL.

In a case in which a value of pic_type is 2, pic_type may indicate a BLA picture which has a related leading picture. In this case, nal_unit_type may indicate BLA_N_LP.

In a case in which a value of pic_type is 3, pic_type may indicate a BLA picture which has a related RADL picture but does not have a related RASL picture. In this case, nal_unit_type may indicate BLA_W_RADL.

In a case in which a value of pic_type is 4, pic_type may indicate a BLA picture which has a related RADL picture and a related RASL picture. In this case, nal_unit_type may indicate BLA_W_LP.

In a case in which a value of pic_type is 5, pic_type may indicate a CRA picture which has a related leading picture. In this case, nal_unit_type may indicate CRA_NUT.

In a case in which a value of pic_type is 7, pic_type may indicate a Random Access Decodable Leading (RADL) picture. In this case, nal_unit_type may indicate RADL_N or RADL_R.

In a case in which a value of pic_type is 8, pic_type may indicate a Random Access Skipped Leading (RASL) picture. In this case, nal_unit_type may indicate RASL N or RASL R.

In a case in which a value of pic_type is 9, pic_type may indicate undecided picture I.

A value of pic_type 10 may correspond to an unknown value.

Values of pic_type 11 to 15 may correspond to reserved values.

FIG. 13 is a view showing the configuration of a trick play box for supporting a trick play of an HEVC stream having a max_temporal_id of 0 in a case in which pic_type does not include contents related to a leading picture according to an embodiment of the present invention (scenario 1-1).

This figure shows a signaling method of a trick play box for executing a trick play of a stream having a maximum temporal_id of 0.

According to an embodiment of the present invention, a new box "trikhvc" may be defined. A trikhvc box according to an embodiment of the present invention may include a pic_type field and/or a dependency_level field in a for loop repeated by a sample_count_value.

Sample_count may mean the total number of pictures included in a stream. One sample may mean one picture.

The pic_type field may mean a picture type defined in NAL_unit_type of HEVC. Some NAL_unit_types which may be used for a trick play may be selected and used as pic_type according to an embodiment of the present invention. The pic_type field may indicate a value of 3 bits.

The dependency_level field may indicate a dependency_level of a corresponding picture. Dependency_level according to an embodiment of the present invention may be used in a case in which a trick play is executed. The dependency_level field may be identical to a dependency_level field used in a conventional trick play box of AVC. For example, execution of a trick play including samples having a dependency_level of 3 may mean decoding and displaying of only samples having a dependency_level of 1, 2, or 3. Consequently, dependency_level may mean a level of a layer which may be discarded in executing a trick play. Even in a case in which a leading picture exists, a decodable leading picture may have a dependency_level and a receiving side may decode and display only corresponding pictures while skipping non-corresponding pictures in the same manner as in a conventional trick play method. The dependency_level field may indicate a value of 5 bits.

Figures 14, 15:
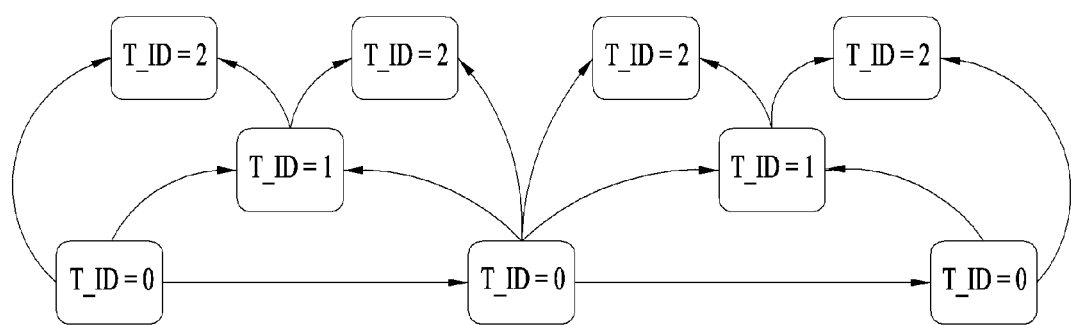
FIG. 14 is a view showing the configuration of a trick play box for supporting a trick play of an HEVC stream having a max_temporal_id of 0 in a case in which pic_type does not include contents related to a leading picture according to another embodiment of the present invention.
FIG. 15 is a view showing the configuration of an HEVC stream supporting temporal scalability according to an embodiment of the present invention.

FIG. 14 is a view showing the configuration of a trick play box for supporting a trick play of an HEVC stream having a max_temporal_id of 0 in a case in which pic_type does not include contents related to a leading picture according to another embodiment of the present invention (scenario 1-1).

This figure shows a signaling method of a trick play box for executing a trick play of a stream having a maximum temporal_id of 0.

According to an embodiment of the present invention, a trick play of an HEVC stream may be executed using a conventionally defined box "trik". According to an embodiment of the present invention, an AVC or HEVC trick play may be selected using a flag.

A trik box according to an embodiment of the present invention may include a pic_type field and/or a dependency_level field in a for loop repeated by a value of flag and sample_count.

In a case in which a value of flag according to an embodiment of the present invention is 0, the trik box may signal an H.264/AVC trick play. In a case in which a value of flag is 1, the trik box may signal an HEVC trick play.

Sample_count may mean the total number of pictures included in a stream. One sample may mean one picture.

The pic_type field may mean a picture type defined in NAL_unit_type of HEVC. Some NAL_unit_types which may be used for a trick play may be selected and used as pic_type according to an embodiment of the present invention. In a case in which a value of flag according to an embodiment of the present invention is 0, the pic_type field may indicate a value of 2 bits. In a case in which a value of flag is 1, the pic_type field may indicate a value of 3 bits.

The dependency_level field may indicate a dependency_level of a corresponding picture. Dependency_level according to an embodiment of the present invention may be used in a case in which a trick play is executed. The dependency_level field may be identical to a dependency_level field used in a conventional trick play box of AVC. For example, execution of a trick play including samples having a dependency_level of 3 may mean decoding and displaying of only samples having a dependency_level of 1, 2, or 3. Consequently, dependency_level may mean a level of a layer which may be discarded in executing a trick play. Even in a case in which a leading picture exists, a decodable leading picture may have a dependency_level and a receiving side may decode and display only corresponding pictures while skipping non-corresponding pictures in the same manner as in a conventional trick play method. In a case in which a value of flag according to an embodiment of the present invention is 0, the dependency_level field may indicate a value of 6 bits. In a case in which a value of flag is 1, the dependency_level field may indicate a value of 5 bits.

According to another embodiment of the present invention, pic_type may be configured as follows in a case in which a limitation that a leading picture is not displayed during execution of a trick play is included. In a case in which a value of pic_type is 0, pic_type may indicate that a corresponding sample is an unknown sample. In a case in which a value of pic_type is 1, pic_type may indicate that a corresponding sample is an IDR sample. In a case in which a value of pic_type is 2, pic_type may indicate that a corresponding sample is a CRA sample. In a case in which a value of pic_type is 3, pic_type may indicate that a corresponding sample is a BLA sample. In a case in which a value of pic_type is 4, pic_type may indicate that a corresponding sample is an unconstrained I sample. In this case, the number of bits assigned to the pic_type field and/or the dependency_level for the HEVE stream may be reduced. A sample may indicate the same meaning as a picture.

FIG. 15 is a view showing the configuration of an HEVC stream supporting temporal scalability according to an embodiment of the present invention.

In this figure, each quadrilateral box may indicate a picture included in a stream and T_ID may indicate temporal id.

FIG. 16 is a view showing the configuration of a trick play box for restricting the maximum X speed to support a trick play in an HEVC stream supporting temporal scalability according to an embodiment of the present invention (scenario 2).

This figure shows a method of signaling such that a maximally supportable X speed is restricted to support a trick play in a HEVC stream having a max_temporal_id of more than 0, i.e. supporting temporal scalability. For example, in a case in which a maximum temporal_id is 2, a maximum of X4 speed may be provided.

According to an embodiment of the present invention, a new box "trikhvc" may be defined. A trikhvc box according to an embodiment of the present invention may include a pic_type field, a temporal_sub_layer_pic_type field, a max_temporal_id field, a temporal_id field, a constraint_trick_play_mode field, and/or a next_temporal_id field in a for loop repeated by a value of sample_count.

Sample_count may mean the total number of pictures included in a stream. One sample may mean one picture.

The pic_type field may mean a picture type defined in NAL_unit_type of HEVC. Some NAL_unit_types which may be used for a trick play may be selected and used as pic_type according to an embodiment of the present invention. The pic_type field may indicate a value of 4 bits.

The temporal_sub_layer_pic_type field may indicate whether a corresponding picture is a Temporal Sub-layer Access (TSA) picture or a Step-wise Temporal Sub-layer Access (STSA) picture. In a case in which temporal_sub_layer_pic_type is 1, temporal_sub_layer_pic_type may indicate that a corresponding picture is a TSA picture. In a case in which temporal_sub_layer_pic_type is 2, temporal_sub_layer_pic_type may indicate that a corresponding picture is an STSA picture. In a case in which temporal_sub_layer_pic_type is 3, temporal_sub_layer_pic_type may indicate that a corresponding picture is an unknown picture. HEVC may classify temporal_sub_layer_access_pictures to provide temporal scalability and to adaptively change a frame rate. That is, HEVC may dynamically change a frame rate based on a TSA picture and an STSA picture in a layer not having a temporal_id of 0. There may be a difference between TSA and STSA in terms of how and how much a frame rate can be changed. That is, there may be a difference between TSA and STSA in terms of how many temporal_ids can be skipped at once. For example, on the assumption that, in a case in which temporal_id is 0, a frame rate is 15p, in a case in which temporal_id is 1, a frame rate is 30p, and, in a case in which temporal_id is 2 (max_temporal_id), a frame rate is 60p, TSA may directly access a layer having a temporal_id of 2 from a layer having a temporal_id of 0 and, therefore, a broadcasting system may directly change a service such that a service having a frame rate of 60p is provided while a service having a frame rate of 15p is being provided. On the other hand, only stepwise access is possible for STSA and, therefore, STSA may access a layer having a temporal_id of 1 from a layer having a temporal_id of 0 and then access a layer having a temporal_id of 2. In this case, therefore, the broadcasting system may sequentially provide a service having a frame rate of 15p, a service having a frame rate of 30p, and a service having a frame rate of 60p.

The max_temporal_id field may indicate a maximum value of temporal_id included in a stream.

The temporal_id field may indicate a value of temporal id calculated using a value of nuh_temporal_id_plus1 of HEVC. A value of the temporal_id field may indicate a value obtained by subtracting 1 from a value of nuh_temporal_id_plus1.

The constraint_trick_play_mode field may indicate providable maximum X speed information. The present invention may signal a providable maximum X speed through an equation of max_trick_play_mode (providable maximum X speed)=2^(max_temporal_id) using a value of max_temporal_id. For example, in a case in which a maximum temporal id is 2, the present invention may maximally provide an X4 speed (2^2). According to an embodiment of the present invention, the present invention may provide a limitation that a value less than the value calculated through the above-described equation is assigned to max_trick_play_mode. For example, in a case in which a value of max_trick_play_mode is 1, it may indicate an X2 speed. In a case in which a value of max_trick_play_mode is 2, it may indicate an X4 speed. In a case in which a value of max_trick_play_mode is 3, it may indicate an X8 speed. In a case in which a value of max_trick_play_mode is 4, it may indicate an X16 speed. Constraint_trick_play_mode may have the same meaning as max_trick_play_mode. According to an embodiment of the present invention, an X speed higher than max_trick_play_mode may not be supported but an X speed equal to max_trick_play_mode may be supported. In addition, according to an embodiment of the present invention, a constraint that a value less than a value of max_trick_play_mode is assigned may be signaled.

The next_temporal_id field may indicate a movable temporal_id to inform of a maximally changeable frame rate according to temporal_sub_layer_pic_type. For example, when it is necessary to return to a normal X speed (X1 speed) during provision of an X4 speed trick play for displaying only pictures having a temporal_id of 0 in a stream having a max_temporal_id of 2, next_temporal_id may have a value of max_temporal_id in a case in which temporal_sub_layer_pic_type is TSA. On the other hand, next_temporal_id may have a value obtained by adding 1 to a value of temporal_id in a case in which temporal_sub_layer_pic_type is STSA.

FIG. 17 is a view showing the configuration of a trick play box for restricting the maximum X speed to support a trick play in an HEVC stream supporting temporal scalability according to another embodiment of the present invention (scenario 2)

This figure shows a method of signaling such that a maximally supportable X speed is restricted to support a trick play in a HEVC stream having a max_temporal_id of more than 0, i.e. supporting temporal scalability. For example, in a case in which a maximum temporal_id is 2, a maximum of X4 speed may be provided.

According to an embodiment of the present invention, a trick play of an HEVC stream may be executed using a conventionally defined box "trik". According to an embodiment of the present invention, an AVC or HEVC trick play may be selected using a flag.

A trik box according to an embodiment of the present invention may include a pic_type field, dependency_level field, temporal_sub_layer_pic_type field, max_temporal_id field, temporal_id field, constraint_trick_play_mode field, and/or a next_temporal_id field in a for loop repeated by a value of flag and sample_count.

Sample_count may mean the total number of pictures included in a stream. One sample may mean one picture.

The pic_type field may mean a picture type defined in NAL_unit_type of HEVC. Some NAL_unit_types which may be used for a trick play may be selected and used as pic_type according to an embodiment of the present invention. In a case in which a value of flag according to an embodiment of the present invention is 0, the pic_type field may indicate a value of 2 bits. In a case in which a value of flag is 1, the pic_type field may indicate a value of 4 bits.

The dependency_level field may indicate a dependency level of a corresponding picture. Dependency_level according to an embodiment of the present invention may be used in a case in which a trick play is executed. The dependency_level field may be identical to a dependency_level field used in a conventional trick play box of AVC. For example, execution of a trick play including samples having a dependency_level of 3 may mean decoding and displaying of only samples having a dependency_level of 1, 2, or 3. Consequently, dependency_level may mean a level of a layer which may be discarded in executing a trick play. Even in a case in which a leading picture exists, a decodable leading picture may have a dependency_level and a receiving side may decode and display only corresponding pictures while skipping non-corresponding pictures in the same manner as in a conventional trick play method. The dependency_level field may indicate a value of 6 bits.

The temporal_sub_layer_pic_type field may indicate whether a corresponding picture is a Temporal Sub-layer Access (TSA) picture or a Step-wise Temporal Sub-layer Access (STSA) picture. In a case in which temporal_sub_layer_pic_type is 1, temporal_sub_layer_pic_type may indicate that a corresponding picture is a TSA picture. In a case in which temporal_sub_layer_pic_type is 2, temporal_sub_layer_pic_type may indicate that a corresponding picture is an STSA picture. In a case in which temporal_sub_layer_pic_type is 3, temporal_sub_layer_pic_type may indicate that a corresponding picture is an unknown picture. HEVC may classify temporal_sub_layer_access_pictures to provide temporal scalability and to adaptively change a frame rate. That is, HEVC may dynamically change a frame rate based on a TSA picture and an STSA picture in a layer not having a temporal_id of 0. There may be a difference between TSA and STSA in terms of how and how much a frame rate can be changed. That is, there may be a difference between TSA and STSA in terms of how many temporal_ids can be skipped at once. For example, on the assumption that, in a case in which temporal_id is 0, a frame rate is 15p, in a case in which temporal_id is 1, a frame rate is 30p, and, in a case in which temporal_id is 2

(max_temporal_id), a frame rate is 60p, TSA may directly access a layer having a temporal_id of 2 from a layer having a temporal_id of 0 and, therefore, a broadcasting system may directly change a service such that a service having a frame rate of 60p is provided while a service having a frame rate of 15p is being provided. On the other hand, only stepwise access is possible for STSA and, therefore, STSA may access a layer having a temporal_id of 1 from a layer having a temporal_id of 0 and then access a layer having a temporal_id of 2. In this case, therefore, the broadcasting system may sequentially provide a service having a frame rate of 15p, a service having a frame rate of 30p, and a service having a frame rate of 60p.

The max_temporal_id field may indicate a maximum value of temporal_id included in a stream.

The temporal_id field may indicate a value of temporal id calculated using a value of nuh_temporal_id_plus1 of HEVC. A value of the temporal_id field may indicate a value obtained by subtracting 1 from a value of nuh_temporal_id_plus1.

The constraint_trick_play_mode field may indicate providable maximum X speed information. The present invention may signal a providable maximum X speed through an equation of max_trick_play_mode (providable maximum X speed)=2^(max_temporal_id) using a value of max_temporal_id. For example, in a case in which a maximum temporal id is 2, the present invention may maximally provide an X4 speed (2^2). According to an embodiment of the present invention, the present invention may provide a limitation that a value less than the value calculated through the above-described equation is assigned to max_trick_play_mode. For example, in a case in which a value of max_trick_play_mode is 1, it may indicate an X2 speed. In a case in which a value of max_trick_play_mode is 2, it may indicate an X4 speed. In a case in which a value of max_trick_play_mode is 3, it may indicate an X8 speed. In a case in which a value of max_trick_play_mode is 4, it may indicate an X16 speed. Constraint_trick_play_mode may have the same meaning as max_trick_play_mode.

The next_temporal_id field may indicate a movable temporal_id to inform of a maximally changeable frame rate according to temporal_sub_layer_pic_type. For example, when it is necessary to return to a normal X speed (X1 speed) during provision of an X4 speed trick play for displaying only pictures having a temporal_id of 0 in a stream having a max_temporal_id of 2, next_temporal_id may have a value of max_temporal_id in a case in which temporal_sub_layer_pic_type is TSA. On the other hand, next_temporal_id may have a value obtained by adding 1 to a value of temporal_id in a case in which temporal_sub_layer_pic_type is STSA.

Figure 18:
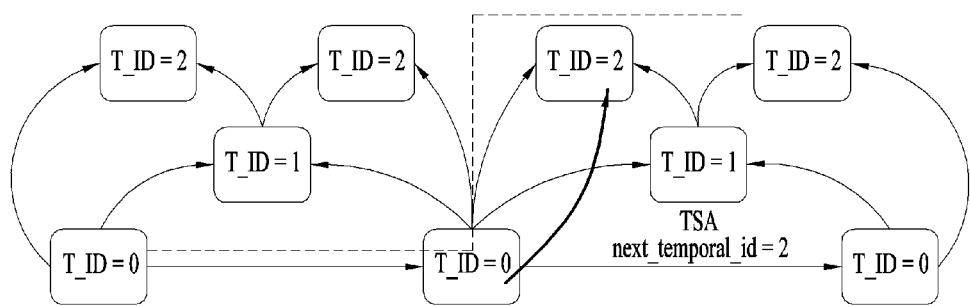
FIG. 18 is a view showing a frame rate changing method in a case in which a temporal sub-layer picture type is TSA according to an embodiment of the present invention.

FIG. 18 is a view showing a frame rate changing method in a case in which a temporal sub-layer picture type is TSA according to an embodiment of the present invention.

In a case in which a temporal sub-layer picture type is TSA as shown in this figure, a receiving side may directly display a stream at an X1 speed (normal X speed) during display of only a stream of a layer having a temporal_id of 0, i.e. during execution of a trick play at an X4 speed.

In a case in which a temporal sub-layer picture type is TSA as shown in this figure, the receiving side may directly decode and display a picture having a temporal_id of 2 during decoding and displaying of a picture having a temporal_id of 0.

Figure 19:
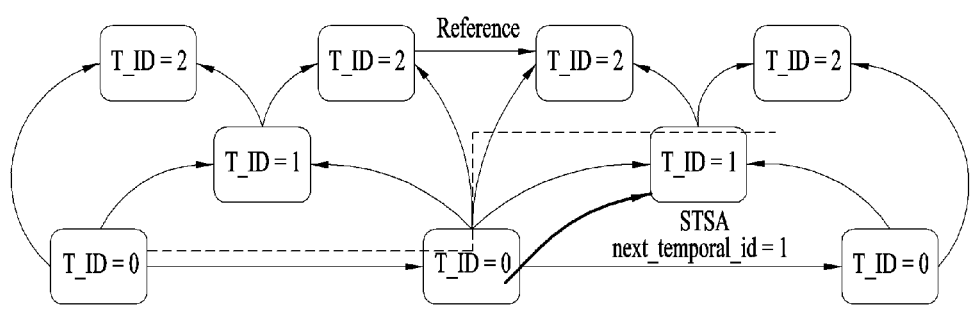
FIG. 19 is a view showing a frame rate changing method in a case in which a temporal sub-layer picture type is STSA according to an embodiment of the present invention.

FIG. 19 is a view showing a frame rate changing method in a case in which a temporal sub-layer picture type is STSA according to an embodiment of the present invention (scenario 3).

In a case in which a temporal sub-layer picture type is STSA as shown in this figure, a receiving side may not directly display a stream at an X1 speed (normal X speed) during display of only a stream of a layer having a temporal_id of 0, i.e. during execution of a trick play at an X4 speed. The receiving side may display a stream at an X2 speed and then display the stream at an X1 speed. In a case in which a temporal sub-layer picture type according to an embodiment of the present invention is STSA, therefore, a method of informing of a limitation for a convertible X speed may be needed. That is, it may be necessary to signal next_temporal_id.

In a case in which a temporal sub-layer picture type is STSA and it is necessary to display a stream at an X1 speed during displaying of the stream at an X4 speed as shown in this figure, the receiving side may not directly decode and display a picture having a temporal_id of 2 during decoding and displaying of a picture having a temporal_id of 0. The receiving side may decode and display a picture having a temporal_id of 1 and then decode and display a picture having a temporal_id of 2.

FIG. 20 is a view showing the configuration of a trick play box for supporting a high X speed trick play in an HEVC stream supporting temporal scalability according to an embodiment of the present invention (scenario 3).

According to an embodiment of the present invention, a new box "trikhvc" may be defined. A trikhvc box according to an embodiment of the present invention may include a pic_type field, a temporal_sub_layer_pic_type field, a max_temporal_id field, a temporal_id field, a next_temporal_id field, and/or a dependency_level field in a for loop repeated by a value of sample_count.

Sample_count may mean the total number of pictures included in a stream. One sample may mean one picture.

The pic_type field may mean a picture type defined in NAL_unit_type of HEVC. Some NAL_unit_types which may be used for a trick play may be selected and used as pic_type according to an embodiment of the present invention. The pic_type field may indicate a value of 4 bits.

The temporal_sub_layer_pic_type field may indicate whether a corresponding picture is a Temporal Sub-layer Access (TSA) picture or a Step-wise Temporal Sub-layer Access (STSA) picture. In a case in which temporal_sub_layer_pic_type is 1, temporal_sub_layer_pic_type may indicate that a corresponding picture is a TSA picture. In a case in which temporal_sub_layer_pic_type is 2, temporal_sub_layer_pic_type may indicate that a corresponding picture is an STSA picture. In a case in which temporal_sub_layer_pic_type is 3, temporal_sub_layer_pic_type may indicate that a corresponding picture is an unknown picture. HEVC may classify temporal_sub_layer_access_pictures to provide temporal scalability and to adaptively change a frame rate. That is, HEVC may dynamically change a frame rate based on a TSA picture and an STSA picture in a layer not having a temporal_id of 0. There may be a difference between TSA and STSA in terms of how and how much a frame rate can be changed. That is, there may be a difference between TSA and STSA in terms of how many temporal_ids can be skipped at once. For example, on the assumption that, in a case in which temporal_id is 0, a frame rate is 15p, in a case in which temporal_id is 1, a frame rate is 30p, and, in a case in which temporal_id is 2 (max_temporal_id), a frame rate is 60p, TSA may directly access a layer having a temporal_id of 2 from a layer having a temporal_id of 0 and, therefore, a broadcasting system may directly change a service such that a service having a frame rate of 60p is provided while a service having a frame rate of 15p is being provided. On the other hand, only stepwise access is possible for STSA and, therefore, STSA may access a layer having a temporal_id of 1 from a layer having a temporal_id of 0 and then access a layer having a temporal_id of 2. In this case, therefore, the broadcasting system may sequentially provide a service having a frame rate of 15p, a service having a frame rate of 30p, and a service having a frame rate of 60p.

The max_temporal_id field may indicate a maximum value of temporal_id included in a stream.

The temporal_id field may indicate a value of temporal id calculated using a value of nuh_temporal_id_plus1 of HEVC. A value of the temporal_id field may indicate a value obtained by subtracting 1 from a value of nuh_temporal_id_plus1.

The next_temporal_id field may indicate a movable temporal_id to inform of a maximally changeable frame rate according to temporal_sub_layer_pic_type. For example, when it is necessary to return to a normal X speed (X1 speed) during provision of an X4 speed trick play for displaying only pictures having a temporal_id of 0 in a stream having a max_temporal_id of 2, next_temporal_id may have a value of max_temporal_id in a case in which temporal_sub_layer_pic_type is TSA. On the other hand, next_temporal_id may have a value obtained by adding 1 to a value of temporal_id in a case in which temporal_sub_layer_pic_type is STSA.

The dependency_level field may indicate a dependency_level of a corresponding picture. Dependency_level according to an embodiment of the present invention may be used in a case in which a trick play is executed. The dependency_level field may be identical to a dependency_level field used in a conventional trick play box of AVC. For example, execution of a trick play including samples having a dependency_level of 3 may mean decoding and displaying of only samples having a dependency_level of 1, 2, or 3. Consequently, dependency_level may mean a level of a layer which may be discarded in executing a trick play. Even in a case in which a leading picture exists, a decodable leading picture may have a dependency_level and a receiving side may decode and display only corresponding pictures while skipping non-corresponding pictures in the same manner as in a conventional trick play method. The dependency_level field may indicate a value of 6 bits.

According to an embodiment of the present invention, the trick play box shown in this figure may include a max_trick_play_mode field indicating the maximum X speed supportable in a trick play.

According to an embodiment of the present invention, in a case in which max_temporal_id is 2, the receiving side may decode only pictures having temporal_ids of 0 and 1 to provide an X2 speed trick play service. In addition, the receiving side may decode and display only pictures having a temporal_id of 0 to provide an X4 speed trick play service. Furthermore, the receiving side may classify pictures having a temporal_id of 0 according to dependency_level and decode and display only pictures having corresponding dependency_level to provide a higher than X4 speed trick play service.

FIG. 21 is a view showing the configuration of a trick play box for supporting a high X speed trick play in an HEVC stream supporting temporal scalability according to another embodiment of the present invention.

According to an embodiment of the present invention, a trick play of an HEVC stream may be executed using a conventionally defined box "trik". According to an embodiment of the present invention, an AVC or HEVC trick play may be selected using a flag.

A trik box according to an embodiment of the present invention may include a pic_type field, a dependency_level field, a temporal_sub_layer_pic_type field, a max_temporal_id field, a temporal_id field, and/or a next_temporal_id field in a for loop repeated by a value of flag and sample_count.

Sample_count may mean the total number of pictures included in a stream. One sample may mean one picture.

The pic_type field may mean a picture type defined in NAL_unit_type of HEVC. Some NAL_unit_types which may be used for a trick play may be selected and used as pic_type according to an embodiment of the present invention. In a case in which a value of flag according to an embodiment of the present invention is 0, the pic_type field may indicate a value of 2 bits. In a case in which a value of flag is 1, the pic_type field may indicate a value of 4 bits.

The dependency_level field may indicate a dependency_level of a corresponding picture. Dependency_level according to an embodiment of the present invention may be used in a case in which a trick play is executed. The dependency_level field may be identical to a dependency_level field used in a conventional trick play box of AVC. For example, execution of a trick play including samples having a dependency_level of 3 may mean decoding and displaying of only samples having a dependency_level of 1, 2, or 3. Consequently, dependency_level may mean a level of a layer which may be discarded in executing a trick play. Even in a case in which a leading picture exists, a decodable leading picture may have a dependency_level and a receiving side may decode and display only corresponding pictures while skipping non-corresponding pictures in the same manner as in a conventional trick play method. The dependency_level field may indicate a value of 6 bits.

The temporal_sub_layer_pic_type field may indicate whether a corresponding picture is a Temporal Sub-layer Access (TSA) picture or a Step-wise Temporal Sub-layer Access (STSA) picture. In a case in which temporal_sub_layer_pic_type is 1, temporal_sub_layer_pic_type may indicate that a corresponding picture is a TSA picture. In a case in which temporal_sub_layer_pic_type is 2, temporal_sub_layer_pic_type may indicate that a corresponding picture is an STSA picture. In a case in which temporal_sub_layer_pic_type is 3, temporal_sub_layer_pic_type may indicate that a corresponding picture is an unknown picture. HEVC may classify temporal_sub_layer_access_pictures to provide temporal scalability and to adaptively change a frame rate. That is, HEVC may dynamically change a frame rate based on a TSA picture and an STSA picture in a layer not having a temporal_id of 0. There may be a difference between TSA and STSA in terms of how and how much a frame rate can be changed. That is, there may be a difference between TSA and STSA in terms of how many temporal_ids can be skipped at once. For example, on the assumption that, in a case in which temporal_id is 0, a frame rate is 15p, in a case in which temporal_id is 1, a frame rate is 30p, and, in a case in which temporal_id is 2 (max_temporal_id), a frame rate is 60p, TSA may directly access a layer having a temporal_id of 2 from a layer having a temporal_id of 0 and, therefore, a broadcasting system may directly change a service such that a service having a frame rate of 60p is provided while a service having a frame rate of 15p is being provided. On the other hand, only stepwise access is possible for STSA and, therefore, STSA may access a layer having a temporal_id of 1 from a layer having a temporal_id of 0 and then access a layer having a temporal_id of 2. In this case, therefore, the broadcasting system may sequentially provide a service having a frame rate of 15p, a service having a frame rate of 30p, and a service having a frame rate of 60p.

The max_temporal_id field may indicate a maximum value of temporal_id included in a stream.

The temporal_id field may indicate a value of temporal id calculated using a value of nuh_temporal_id_plus1 of HEVC. A value of the temporal_id field may indicate a value obtained by subtracting 1 from a value of nuh_temporal_id_plus1.

The next_temporal_id field may indicate a movable temporal_id to inform of a maximally changeable frame rate according to temporal_sub_layer_pic_type. For example, when it is necessary to return to a normal X speed (X1 speed) during provision of an X4 speed trick play for displaying only pictures having a temporal_id of 0 in a stream having a max_temporal_id of 2, next_temporal_id may have a value of max_temporal_id in a case in which temporal_sub_layer_pic_type is TSA. On the other hand, next_temporal_id may have a value obtained by adding 1 to a value of temporal_id in a case in which temporal_sub_layer_pic_type is STSA.

According to an embodiment of the present invention, the trick play box shown in this figure may include a max_trick_play_mode field indicating the maximum X speed supportable in a trick play.

According to an embodiment of the present invention, in a case in which max_temporal_id is 2, the receiving side may decode only pictures having temporal_ids of 0 and 1 to provide an X2 speed trick play service. In addition, the receiving side may decode and display only pictures having a temporal_id of 0 to provide an X4 speed trick play service. Furthermore, the receiving side may classify pictures having a temporal_id of 0 according to dependency_level and decode and display only pictures having a corresponding dependency_level to provide a higher than X4 speed trick play service.

Figure 22:
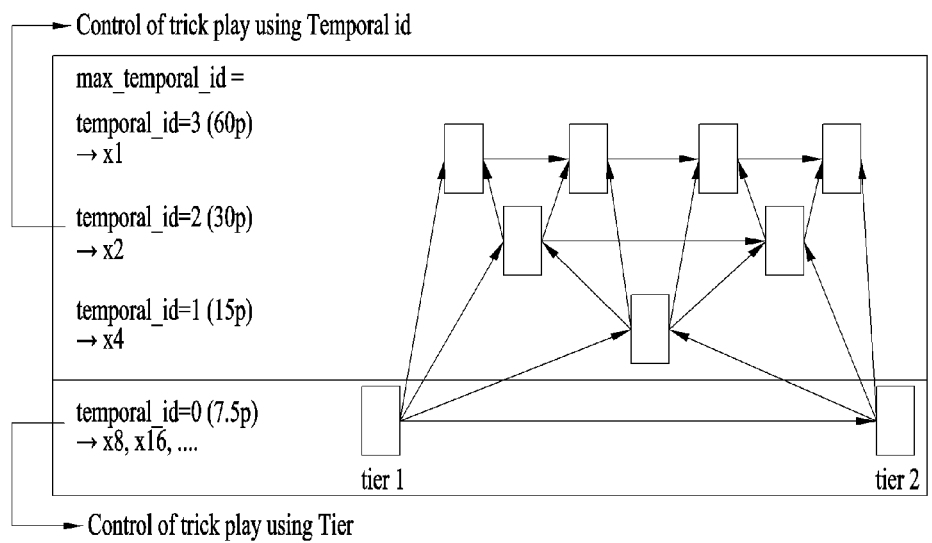
FIG. 22 is a view showing a trick play method using a temporal id and a tier according to an embodiment of the present invention.

FIG. 22 is a view showing a trick play method compositively using a temporal id and a tier according to an embodiment of the present invention.

According to an embodiment of the present invention, a tier value may be assigned to only a picture having a temporal id of 0.

As shown in this figure, a receiver according to an embodiment of the present invention may decode and display pictures having a temporal id of 0, 1, 2, or 3 to execute a normal X speed trick play, may decode and display pictures having a temporal id of 0, 1, or 2 to execute an X2 speed trick play, may decode and display pictures having a temporal id of 0 or 1 to execute an X4 speed trick play, and may decode and display pictures having a temporal id of 0 to execute an X8 speed trick play. The present invention may assign different tier values to pictures having a temporal id of 0 to execute a higher than X8 speed trick play.

According to an embodiment of the present invention, the following methods may be used to provide a trick play. A trick play may be provided by mapping a tier and a temporal id to use a PVR_assist_info descriptor (scenario A). A trick play may be provided by including a trick play using a temporal id in a PVR_assist_info descriptor (scenario B). A trick play may be provided by parsing nuh_temporal_id_plus1 information of NAL_unit_header and selecting only packets necessary for a real trick play (scenario C).

A temporal sub-layer or a temporal id according to an embodiment of the present invention is a term introduced to support temporal scalability in HEVC and may be signaled by nuh_temporal_id_plus1 of NAL_unit_header.

A tier according to an embodiment of the present invention is a term introduced to support a trick play in an AVC stream or an mpeg-2 stream and may be included in an adaptation field in a TS packet.

Figure 23:
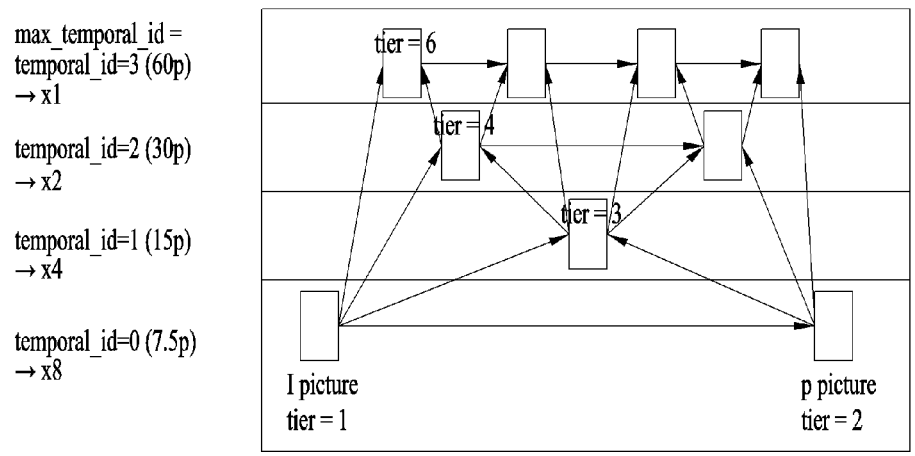
FIG. 23 is a view showing a trick play method based on a conventional tier concept according to an embodiment of the present invention.

FIG. 23 is a view showing a trick play method based on a conventional tier concept according to an embodiment of the present invention.

A conventional tier according to an embodiment of the present invention may indicate dependency between layers.

As shown in this figure, pictures having a temporal id of 3 may have a tier value of 6, pictures having a temporal id of 2 may have a tier value of 4, and pictures having a temporal id of 1 may have a tier value of 3. In addition, I pictures having a temporal id of 0 may have a tier value of 1 and I pictures having a temporal id of 0 may have a tier value of 2. That is, pictures having a temporal id of 0 may have the same temporal and different tier values.

According to an embodiment of the present invention, pictures having max_temporal_id, i.e. highest dependency_level, may have a tier value of 6 or 7. Pictures having other temporal_ids may have a tier value of 1 to 5. At this time, pictures corresponding to a layer having a temporal_id of 0 may have a tier value of 1 or 2 according to a picture type.

Figure 24:
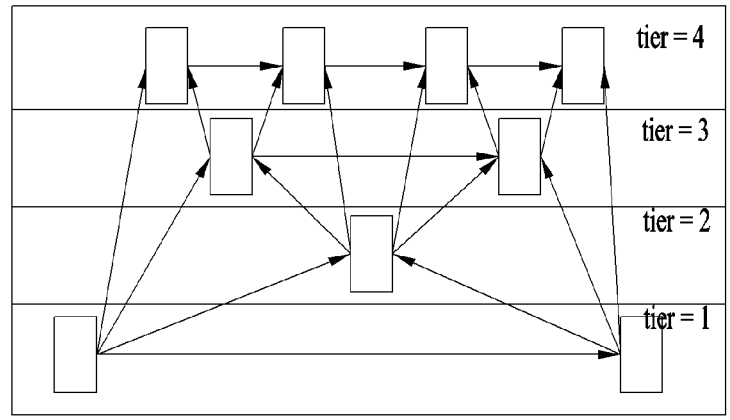
FIG. 24 is a view showing a trick play method based on a method of mapping one temporal id to one tier one to one according to an embodiment of the present invention.

FIG. 24 is a view showing a trick play method based on a method of mapping one temporal id to one tier one to one according to an embodiment of the present invention (scenario A-a).

According to an embodiment of the present invention, a method of mapping a temporal id and a tier may be used to provide a trick play based on an HEVC stream which includes a temporal id but does not include tier information (scenario A).

In order to provide a trick play according to an embodiment of the present invention, a method of mapping one temporal id to one tier one to one may be used (scenario A-a) and a method of mapping one temporal id to several tiers may be used (scenario A-b).

According to an embodiment of the present invention, in scenario A-a and scenario A-b as described above, a value of temporal id may be mapped to a tier one to one as it is irrespective of the meaning of a conventional tier.

According to another embodiment of the present invention, in scenario A-a and scenario A-b as described above, a value of temporal id may be mapped to a tier one to one and a maximum temporal id may be mapped to tier 6 or 7, which has meaning of a conventional tier as a discardable picture as it is.

According to scenario A as described above, most of a conventional PVR_assist_info descriptor may be used as it is. However, an embodiment of the present invention is based on a HEVC stream and, therefore, it is necessary to modify some fields included in the PVR_assist_info descriptor. For example, it may be newly defined that a PVR_assist_tier_m_cumulative_frames field included in the PVR_assist_info descriptor may deliver a value of the minimum number of frames extractable per 1.28 seconds from tier 1 through a PVR_assist_tier_m field (This field conveys the value of the intended minimum number of extractable frames per 1.28 sec. from tier 1 through "PVR_assist_tier_m").

This figure shows a trick play method based on scenario A-a according to an embodiment of the present invention.

As shown in this figure, pictures having a temporal id of 3 may be mapped to tier 4, pictures having a temporal id of 2 may be mapped to tier 3, pictures having a temporal id of 1 may be mapped to tier 2, and pictures having a temporal id of 0 may be mapped to tier 1.

Scenario A according to an embodiment of the present invention may not provide an 8× and higher speed trick play.

Figure 25:
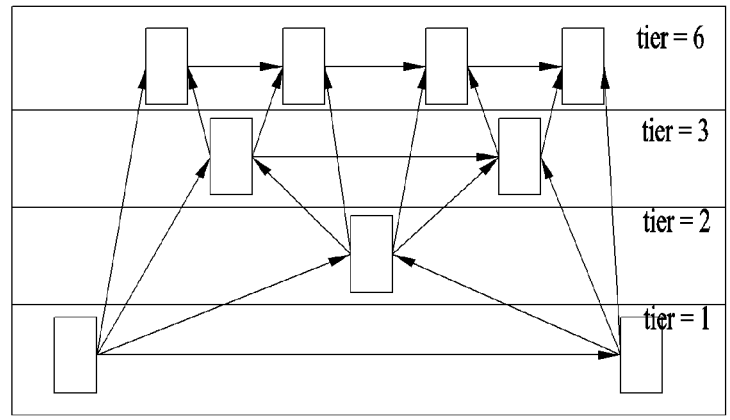
FIG. 25 is a view showing a trick play method based on a method of mapping one temporal id to one tier one to one according to another embodiment of the present invention.

FIG. 25 is a view showing a trick play method based on a method of mapping one temporal id to one tier one to one according to another embodiment of the present invention (scenario A-a).

According to an embodiment of the present invention, a value of temporal id may be mapped to a tier one to one and a maximum temporal id may be mapped to tier 6 or 7, which has meaning of a conventional tier as a discardable picture as it is unlike the previous figure.

As shown in this figure, pictures having a temporal id of 3 may be mapped to tier 6, pictures having a temporal id of 2 may be mapped to tier 3, pictures having a temporal id of 1 may be mapped to tier 2, and pictures having a temporal id of 0 may be mapped to tier 1.

This figure is different from the previous figure in that pictures corresponding to temporal id 3, which is a maximum temporal id, are mapped to tier 6.

Figures 26, 27, 28:
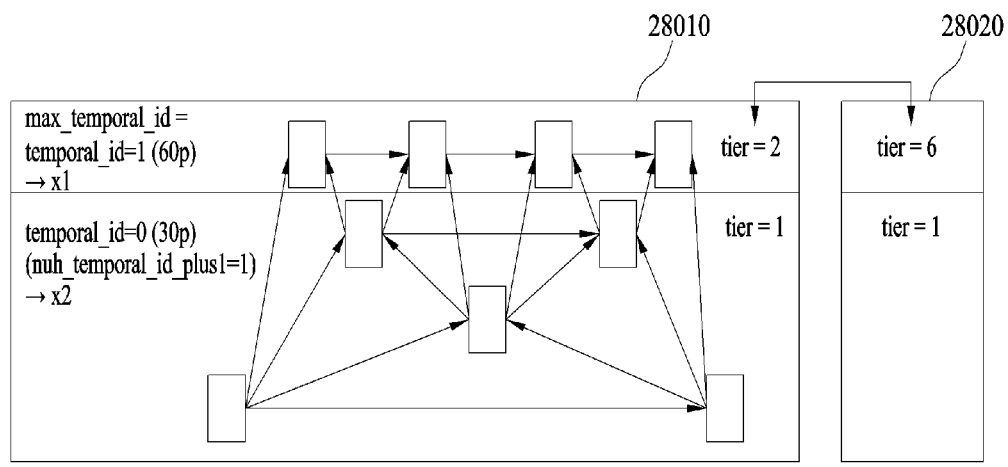
FIG. 26 is a view showing a result of mapping one temporal id to one tier one to one according to an embodiment of the present invention.
FIG. 27 is a view showing a result of mapping one temporal id to one tier one to one according to another embodiment of the present invention.
FIG. 28 is a view showing a trick play method based on a method of mapping one temporal id to several tiers according to an embodiment of the present invention.

FIG. 26 is a view showing a result of mapping one temporal id to one tier one to one according to an embodiment of the present invention.

This figure shows a result of mapping a value of temporal id to a tier one to one as it is irrespective of the meaning of a conventional tier in scenario A-a according to an embodiment of the present invention.

A nuh_temporal_id plus1 field shown in this figure may be a field included in NAL_unit_header and may indicate a value obtained by adding 1 to a temporal id. For example, in a case in which a value of the nuh_temporal_id plus1 field is 1, a temporal id may be 0. As shown in this figure, therefore, pictures having a temporal id of 0 may be mapped to tier 1, pictures having a temporal id of 1 may be mapped to tier 2, pictures having a temporal id of 2 may be mapped to tier 3, and pictures having a temporal id of 3 may be mapped to tier 4.

According to an embodiment of the present invention, a new tier mapped with a temporal id may be different in meaning from a conventionally used tier. Conventional tiers 6 and 7 may mean discardable pictures and tier 7 may mean a picture which is not used as reference. However, a tier newly defined through mapping may not have meaning of conventional tiers 6 and 7.

An embodiment of the present invention may map a temporal sub-layer and a tier so as to have the same number and may use the above-described mapping information when executing a trick play.

FIG. 27 is a view showing a result of mapping one temporal id to one tier one to one according to another embodiment of the present invention.

This figure shows a result of mapping a value of temporal id to a tier one to one and mapping a maximum temporal id to tier 6 or 7, which has meaning of a conventional tier as a discardable picture as it is in scenario A-a according to another embodiment of the present invention.

A nuh_temporal_id plus1 field shown in this figure may be a field included in NAL_unit_header and may indicate a value obtained by adding 1 to a temporal id. For example, in a case in which a value of the nuh_temporal_id plus1 field is 1, a temporal id may be 0. As shown in this figure, therefore, pictures having a temporal id of 0 may be mapped to tier 1, pictures having a temporal id of 1 may be mapped to tier 2, pictures having a temporal id of 2 may be mapped to tier 3, and pictures having a temporal id of 3 may be mapped to tier 6.

According to an embodiment of the present invention, a new tier mapped with a temporal id may be identical in meaning to a conventionally used tier. Tiers 6 and 7 may mean discardable pictures, tier 6 may mean a picture which is used as reference, and tier 7 may mean a picture which is not used as reference. As described above, therefore, pictures having a nuh_temporal_id plus1 of 4 may be mapped to tier 6. Pictures which are not used as reference may be mapped to tier 7.

FIG. 28 is a view showing a trick play method based on a method of mapping one temporal id to several tiers according to an embodiment of the present invention (scenario A-b).

As shown in this figure, pictures having a temporal id of 1, which is a maximum temporal id, may be mapped to tier 4 or 6 and the other five pictures having a temporal id of 0 may be mapped to tiers 0 to 3.

According to an embodiment of the present invention, a new tier mapped with a temporal id may be different in meaning from a conventionally used tier. Conventional tiers 6 and 7 may mean discardable pictures and tier 7 may mean a picture which is not used as reference. However, a tier newly defined through mapping may not have meaning of conventional tiers 6 and 7. As shown in this figure, therefore, pictures having a temporal id of 1 may be mapped to tier 4 (28010).

According to another embodiment of the present invention, a new tier mapped with a temporal id may be identical in meaning to a conventionally used tier. Tiers 6 and 7 may mean discardable pictures, tier 6 may mean a picture which is used as reference, and tier 7 may mean a picture which is not used as reference. As shown in this figure, therefore, pictures having a temporal id of 1 may be mapped to tier 6 (28020).

FIG. 29 is a view showing the configuration of an adaptation field of a TS packet including information for mapping of a temporal id and a tier according to an embodiment of the present invention.

An embodiment of the present invention may provide a descriptor for values of tier and nuh_temporal_id_plus1 with speed information for a trick play.

According to an embodiment of the present invention, information for a conventional trick play is included in an adaptation field of a TS packet and, therefore, HEVC_temporal_id_tier_mapping_info, which is information for a trick play of a HEVC stream including a temporal id, may also be included in the above-described adaptation field.

This figure shows the configuration of a data field included in the adaptation field of the TS packet.

As shown in this figure, in a case in which data_field_tag is 0x00, a corresponding data field may indicate a reserved field. In a case in which data_field_tag is 0x01, a corresponding data field may indicate an announcement switching data field. In a case in which data_field_tag is 0x02, a corresponding data field may indicate a data field for AU_information. In a case in which data_field_tag is 0x03, a corresponding data field may indicate a data field for PVR_assist_information. In a case in which data_field_tag is 0x04, a corresponding data field may indicate a data field indicating a TSAP time line. In a case in which data_field_tag is 0x05, a corresponding data field may indicate a data field for HEVC_temporal_id_tier_mapping_info.

An embodiment of the present invention may map a tier value to a temporal id using an HEVC_temporal_id_ tier_mapping_info descriptor and provide a tier-based trick play using a PVR_assist_information descriptor.

FIG. 30 is a view showing the configuration of HEVC_temporal_id_tier_mapping_info according to an embodiment of the present invention.

HEVC_temporal_id_tier_mapping_info according to an embodiment of the present invention may include an included_temporal_id_flag field, a temporal_sub_layer_dependency_flag field, a max_temporal_id_plus1 field, a temporal_id_plus1 field, a curr_tier_num field, and/or a trick_play_speed field.

The included_temporal_id_flag field may signal whether encoding has been performed using a temporal id.

The temporal_sub_layer_dependency_flag field may indicate dependency between temporal sub-layers. That is, the temporal_sub_layer_dependency_flag field has a value of 1 in a case in which a lower temporal sub-layer picture does not refer to an upper temporal sub-layer picture.

The max_temporal_id_plus1 field may indicate a maximum value of a temporal id. A value indicated by the max_temporal_id_plus1 field is a value obtained by adding 1 to a temporal id.

The temporal_id_plus1 field may have a value equal to a value indicated by nuh_temporal_id_plus1 included in an NAL_unit_header.

The curr_tier_num field may indicate a tier value mapped with temporal_id_plus1.

The trick_play_speed field may indicate a trick play speed that can be maximally provided according to a value of a temporal id.

An if(max_temporal_id_plus1>1) condition statement may indicate a case in which max_temporal_id_plus1 is greater than 1, i.e. a stream using temporal scalability. In this case, a trick play may be provided using a temporal id and, therefore, an embodiment of the present invention may map a temporal id to a tier so as to use conventional PVR_assist_information.

Another embodiment of the present invention may locate the temporal_id_plus1 field in a for loop at the same level as the curr_tier_num field and the trick_play_speed and signal a tier number based on each temporal id and a speed for a trick play. An embodiment of the present invention may create a look up table using a descriptor including the above-described HEVC_temporal_id_tier_mapping_info and may interpret and use tier-related information of PVR_assist_information as temporal_id using the above-described look up table.

Another embodiment of the present invention may delete a for loop from the above-described HEVC_temporal_id_tier_mapping_info and locate the curr_tier_num field and the trick_play_speed at a level at which the temporal_id_plus1 field is located. An embodiment of the present invention may signal a descriptor including the above-described HEVC_temporal_id_tier_mapping_info per picture.

FIG. 31 is a view showing the configuration of a trick_play_speed field included in HEVC_temporal_id_tier_mapping_info according to an embodiment of the present invention.

In a case in which a trick_play_speed field according to an embodiment of the present invention is 0, a providable X speed of a trick play may be an X1 speed. In a case in which a trick_play_speed field is 1, a providable X speed of a trick play may be an X2 speed. In a case in which a trick_play_speed field is 2, a providable X speed of a trick play may be an X4 speed. In a case in which a trick_play_speed field is 3, a providable X speed of a trick play may be an X8 speed. In a case in which a trick_play_speed field is 4, a providable X speed of a trick play may be an X16 speed. In a case in which a trick_play_speed field is 5, a providable X speed of a trick play may be an X32 speed. In a case in which a trick_play_speed field is 6, a providable X speed of a trick play may be an X64 speed.

FIG. 32 is a view showing the configuration of PVR_assist_information according to an embodiment of the present invention.

PVR_assist_information according to an embodiment of the present invention may include a data_field_tag field, a data_field_length field, a PVR_assist_tier_pic_num field, a PVR_assist_block_trick_mode_present_flag field, a PVR_assist_pic_struct_present_flag field, a PVR_assist_tier_next_pic_in_tier_present_flag field, a PVR_assist_substream_info_present_flag field, a PVR_assist_extension_present_flag field, a PVR_assist_segmentation_info_present_flag field, a PVR_assist_tier_m_cumulative_frames_present_flag field, a PVR_assist_tier_n_mmco_present_flag field, a PVR_assist_reserved_0 field, a PVR_assist_seg_id field, a PVR_assist_prg_id field, a PVR_assist_seg_start_flag field, a PVR_assist_seg_end_flag field, a PVR_assist_prg_start_flag field, a PVR_assist_prg_stop_flag field, a PVR_assist_scene_change_flag field, a PVR_assist_tier_m_field, a PVR_assist_tier_m_cumulative_frames field, and/or a PVR_assist_tier_n_mmco field.

The data_field_tag field may indicate that a corresponding data field is PVR_assist_information. The data_field_tag field may have a value of 0x03.

The data_field_length field may indicate a length of PVR_assist_information excluding the data_field_tag field and the data_field_length field.

The PVR_assist_tier_pic_num field may indicate a tier number of a picture related to PVR_assist_information. A minimum tier number may be 0 and a maximum tier number may be 7. Tier number 0 may be reserved for future use. According to an embodiment of the present invention, for HEVC, a tier number of a HEVC RAP picture may be 0 and a tier number of all other pictures different from the HEVC RAP may be a value obtained by adding 1 to a temporal id. According to an embodiment of the present invention, this field may indicate a tier number of a picture included in a video stream and may be named tier number information. The tier number may be used to signal a temporal sub-layer. PVR_assist_tier_pic_num may be named tier number information.

The PVR_assist_block_trick_mode_present_flag field may have a value of 1 at a picture which is not a RAP picture in a case in which this field has a value of 1 at the previous RAP picture.

The PVR_assist_pic_struct_present_flag field may have a value of 1 in a case in which a video stream is an AVC or HEVC stream and a PVR_assist_pict_struct field exists.

The PVR_assist_tier_next_pic_in_tier_present_flag field may have a value of 1 in a case in which a PVR_assist_tier_next_pic_in_tier field exists.

The PVR_assist_substream_info_present_flag may have a value of 1 in a case in which a PVR_assist_substream_info field exists.

The PVR_assist_extension_present_flag field may have a value of 1 in a case in which any one selected from among the PVR_assist_segmentation_info_present_flag field, the PVR_assist_tier_m_cumulative_frames_present_flag field, the PVR_assist_tier_n_mmco_present_flag field, and a PVR_assist_temporal_id_info_present_flag field has a value of 1.

The PVR_assist_segmentation_info_present_flag field may have a value of 1 in a case in which a PVR_assist_segmentation_info field exists.

The PVR_assist_tier_m_cumulative_frames_present_flag field may have a value of 1 in a case in which the PVR_assist_tier_m_field and the PVR_assist_tier_m_cumulative_frames field exist. For HEVC, it may be recommended that this field has a value of 0.

The PVR_assist_tier_n_mmco_present_flag field may have a value of 1 in a case in which the PVR_assist_tier_n_mmco field exists. For HEVC, this field may have a value of 0.

The PVR_assist_seg_id field may deliver an id of a segment to which a picture belongs.

The PVR_assist_prg_id field may deliver an id of a program to which a picture belongs.

The PVR_assist_seg_start_flag field may have a value of 1 in a case of a picture having a first presentation order in one segment.

The PVR_assist_seg_end_flag field may have a value of 1 in a case of a picture having a last presentation order in one segment.

The PVR_assist_prg_start_flag field may have a value of 1 in a case of a picture having a first presentation order in one program.

The PVR_assist_prg_stop_flag field may have a value of 1 in a case of a picture having a last presentation order in one program.

The PVR_assist_scene_change_flag field may have a value of 1 in a case of a first picture of a new scene in presentation order.

The PVR_assist_tier_m field may indicate a tier number related to the PVR_assist_tier_m_cumulative_frames field. For HEVC, this field may not exist.

The PVR_assist_tier_m_cumulative_frames field may deliver a value of the minimum number of frames extractable per second from tier 1 through the PVR_assist_tier_m_field.

The PVR_assist_tier_n_mmco field may indicate a minimum tier number below MMCOs which may be ignored by a decoder during execution of a trick play. For HEVC, this field may not exist.

PVR_assist_information according to an embodiment of the present invention may further include a PVR_assist_tier_next_pic_tier field. The PVR_assist_tier_next_pic_tier may indicate a relative position of the next picture in decoding order among pictures having a tier number equal to a value indicated by the PVR_assist_tier_pic_num field and may be named tier next picture information.

PVR_assist_information according to an embodiment of the present invention may include metadata for executing a trick play of video data and may be named PVR assist information.

FIG. 33 is a view showing the configuration of PVR_assist_information having a temporal id frame work added thereto according to an embodiment of the present invention (scenario B-a-a).

An embodiment of the present invention may provide a method of including a trick play using a temporal id in conventional PVR_assist_information included in an adaptation field of a TS packet. That is, an embodiment of the present invention may provide a temporal id frame work.

An embodiment of the present invention may signal PVR_assist_temporal_id_plus1 together with conventional PVR_assist_tier_pic_num to support temporal scalability based on a temporal id.

According to an embodiment of the present invention, PVR_assist_information may include all fields described above with reference to the previous figure showing the configuration of PVR_assist_information, a PVR_assist_temporal_id_plus1 field, PVR_assist_temporal_id_info_present_flag field, and/or a PVR_assist_max_temporal_id_plus1 field.

In this figure, fields having the same names as the fields described above with reference to the previous figure showing the configuration of PVR_assist_information may have the same meanings as the fields described above with reference to the previous figure.

The PVR_assist_temporal_id_plus1 field may indicate a value of a temporal id of a current frame and may actually indicate a value equal to a value of nuh_temporal_id_plus1 included in an NAL unit header.

The PVR_assist_temporal_id_info_present_flag field may include whether information related to a temporal id is included. In a case in which the PVR_assist_max_temporal_id_plus1 field exists, this field may indicate a value of 1. This field may be provided for every RAP picture.

The PVR_assist_max_temporal_id_plus1 field may indicate a maximum value of a temporal id and may actually indicate a value obtained by adding 1 to the maximum value of the temporal id. This field may have a value of any one selected from among 0 to 6. This field may be used to provide information regarding speed of a trick play.

According to an embodiment of the present invention, an X speed of a trick play may be calculated using a value of the PVR_assist_max_temporal_id_plus1 field and a value of the PVR_assist_temporal_id_plus1 field.

FIG. 34 is a view showing the configuration of PVR_assist_information having a temporal id frame work added thereto according to another embodiment of the present invention (scenario B-a-b).

An embodiment of the present invention may provide a method of including a trick play using a temporal id in conventional PVR_assist_information included in an adaptation field of a TS packet. That is, an embodiment of the present invention may provide a temporal id frame work.

An embodiment of the present invention may use a PVR_assist_tier_pic_num field as it is and may contain meaning of PVR_assist_temporal_id_plus1 in the PVR_assist_tier_pic_num field. In addition, an embodiment of the present invention may inform that meaning of a tier has been changed using a PVR_assist_tier_pic_num_to_temporal_id_flag field.

According to an embodiment of the present invention, PVR_assist_information may include all fields described above with reference to the previous figure showing the configuration of PVR_assist_information, a PVR_assist_tier_pic_num_to_temporal_id_flag field, a PVR_assist_temporal_id_info_present_flag field, and/or a PVR_assist_max_temporal_id_plus1 field.

In this figure, fields having the same names as the fields described above with reference to the previous figure showing the configuration of PVR_assist_information may have the same meanings as the fields described above with reference to the previous figure. However, the PVR_assist_tier_pic_num field may be used for the temporal id frame work as it is according to an embodiment of the present invention. That is, the PVR_assist_tier_pic_num field may indicate a value of a temporal id of a current frame and may actually have a value equal to a value of nuh_temporal_id_plus1 included in an NAL unit header.

The PVR_assist_tier_pic_num_to_temporal_id_flag field may have a value of 1 in a case in which the PVR_assist_tier_pic_num is used as a field indicating a temporal id.

The PVR_assist_temporal_id_info_present_flag field may indicate whether information related to a temporal id is included.

The PVR_assist_max_temporal_id_plus1 field may indicate a maximum value of a temporal id and may actually indicate a value obtained by adding 1 to the maximum value of the temporal id.

According to an embodiment of the present invention, an X speed of a trick play may be calculated using a value of the PVR_assist_tier_pic_num having meaning of the PVR_assist_max_temporal_id_plus1 field and the PVR_assist_temporal_id_plus1 field.

Another embodiment of the present invention may include a PVR_assist_framework field having a value of 2 bits or more in PVR_assist_information to classify types of frameworks providing PVR. An embodiment of the present invention may classify a conventional tier, a substream framework, and a temporal id framework. In this case, flag values included in conventional PVR_assist_information may not be used and an embodiment of the present invention may configure a condition statement on behalf of a tag value corresponding to each framework.

FIG. 35 is a view showing the configuration of PVR_assist_information for supporting a trick play using a temporal id according to an embodiment of the present invention (scenario B-b).

PVR_assist_information according to an embodiment of the present invention may include a data_field_tag field, a data_field_length field, a PVR_assist_temporal_id_plus1 field, a PVR_assist_substream_info_present_flag field, a PVR_assist_extension_present_flag field, a PVR_assist_temporal_id_present_flag field, a PVR_assist_temporal_sub_layer_dependency_flag field, a PVR_assist_max_temporal_id_plus1 field, a PVR_assist_curr_tier_num field, and/or a PVR_assist_trick_play_speed field.

The data_field_tag field may indicate that a corresponding data field is PVR_assist_information. The data_field_tag field may have a value of 0x03.

The data_field_length field may indicate a length of PVR_assist_information excluding the data_field_tag field and the data_field_length field.

The PVR_assist_temporal_id_plus1 field may indicate a value of a temporal id of a current frame and may actually indicate a value equal to a value of nuh_temporal_id_plus1 included in an NAL unit header.

The PVR_assist_substream_info_present_flag field may have a value of 1 in a case in which a PVR_assist_substream_info field exists.

The PVR_assist_extension_present_flag field may have a value of 1 in a case in which any one selected from among a PVR_assist_segmentation_info_present_flag field, a PVR_assist_tier_m_cumulative_frames_present_flag field, and a PVR_assist_tier_n_mmco_present_flag field has a value of 1.

The PVR_assist_temporal_id_info_present_flag field may indicate whether information related to a temporal id is included.

The PVR_assist_temporal_sub_layer_dependency_flag field may indicate dependency between temporal sub-layers. That is, the temporal_sub_layer_dependency_flag field has a value of 1 in a case in which a lower temporal sub-layer picture does not refer to an upper temporal sub-layer picture.

The PVR_assist_max_temporal_id_plus1 field may indicate a maximum value of a temporal id and may actually indicate a value obtained by adding 1 to the maximum value of the temporal id.

The PVR_assist_curr_tier_num field may indicate a tier value corresponding to temporal_id_plus1.

The trick_play_speed field may indicate a trick play speed that can be maximally provided according to a value of a temporal id.

An if(PVR_assist_max_temporal_id_plus1>1) condition statement may indicate a case in which PVR_assist_max_temporal_id_plus1 is greater than 1, i.e. a stream using temporal scalability. In this case, a trick play may be provided using a temporal id.

Another embodiment of the present invention may locate the PVR_assist_temporal_id_plus1 field in a for loop at the same level as the PVR_assist_curr_tier_num field and the PVR_assist_trick_play_speed field and signal a tier number based on each temporal id and a speed for a trick play.

Another embodiment of the present invention may change and use a value of the PVR_assist_tier_pic_num field so as to indicate a value of the PVR_assist_temporal_id_plus1 field in a state in which the above-described field is left as it is. In this case, it is necessary to signal that meaning of the PVR_assist_tier_pic_num field has been changed using the PVR_assist_tier_pic_num_to_temporal_id_flag field.

A further embodiment of the present invention may provide a trick play using only a temporal id without a tier. That is, a trick play may be provided by parsing nuh_temporal_id_plus1 information of NAL_unit_header and selecting only packets necessary for a real trick play (scenario C). For example, in a case in which it is necessary to play a stream having a temporal id of 0 to 3 at an X2 speed, an embodiment of the present invention may provide an X2 speed trick play by delivering only a TS packet having a nuh_temporal_id_plus1 value of 1, 2, or 3 to a system decoder.

FIG. 36 is a view showing a receiving apparatus according to an embodiment of the present invention.

A receiving apparatus according to an embodiment of the present invention may include a tuner 36010, a demodulator 36020, a trick play execution unit 36030, a system decoder and demux 36040, and/or a video decoder 36050.

The tuner 36010 may receive a broadcast signal transmitted through a broadcasting network, a cable network, and/or an Internet network.

The demodulator 36020 may demodulate a broadcast signal modulated according to a modulation method.

The trick play execution unit 36030 may select a TS packet for a trick play according to a method based on scenarios. Scenarios 1, 2, and 3 according to an embodiment of the present invention have been previously described in detail.

The system decoder and demux 36040 may decode system information and separate a multiplexed broadcast signal per unit stream. The demux may demultiplex a received broadcast signal to extract a video stream.

The video decoder 36050 may decode a video stream. The video decoder may include the system decoder and the trick play execution unit. The video decoder may execute a trick play of a video stream by decoding a video stream selected for a trick play based on the PVR assist information. The video decoder may execute a trick play based on the temporal identification information and the maximum temporal identification information included in the PVR assist information.

FIG. 37 is a view showing comparison between a tier framework and an HEVC temporal sub-layer according to an embodiment of the present invention.

A hierarchical structure of an HEVC temporal sub-layer according to an embodiment of the present invention is similar to a tier system framework. A temporal id according to an embodiment of the present invention may be matched to a tier number. An HEVC temporal sub-layer according to an embodiment of the present invention may support PVR using a method similar to the tier system framework.

An HEVC compliant encoder/decoder according to an embodiment of the present invention may support an HEVC temporal sub-layer. An temporal id according to an embodiment of the present invention may exist in a stream encoded by HEVC. In a case in which a stream is encoded by a temporal sub-layer structure, any special encoding structure for a trick play may not be needed. Consequently, an HEVC temporal sub-layer according to an embodiment of the present invention may reduce an encoding burden in a case in which a trick play is supported.

As shown in this figure, in a tier framework, tier 7 means non-referenced discardable pictures and tier 6 means referenced discardable pictures. However, an HEVC temporal sub-layer according to an embodiment of the present invention may not classify referenced pictures and non-referenced pictures. In the tier framework, tier 1 indicates RAP pictures and tier 2 indicates P pictures. In an HEVC temporal sub-layer according to an embodiment of the present invention, however, temporal id 0 may indicate all of I pictures including IRAP pictures, P pictures, and B pictures.

According to an embodiment of the present invention, other sub-layers may be designated to temporal ids 6 and 7. As compared with tier numbers 6 and 7, therefore, an additional X speed may be supported in a case in which a temporal id is used according to an embodiment of the present invention.

According to an embodiment of the present invention, it may be necessary to classify frames in a base sub-layer having a temporal id of 0 so as to support a higher X speed.

FIG. 38 is a view showing the configuration of PVR_assist_information according to another embodiment of the present invention.

According to an embodiment of the present invention, a temporal id given to a video level may be signaled at a system level to filter access units (AUs) before a decoding procedure.

According to an embodiment of the present invention, an intra frame may be signaled in a base sub-layer having a temporal id of 0 so as to support a higher X speed PVR_assist_information according to an embodiment of the present invention may include a data_field_tag field, a data_field_length field, a PVR_assist_temporal_id_plus1 field, a PVR_assist_temporal_id_info_present_flag field, a PVR_assist_intra_picture_flag field, a PVR_assist_max_temporal_id_plus1 field, a PVR_assist_PB_numbers_in_temporal_id_zero field, a PVR_assist_reserved_0_field, and/or a PVR_assist_reserved_byte field.

The data_field_tag field may indicate that a corresponding data field is PVR_assist_information. The data_field_tag field may have a value of 0x03.

The data_field_length field may indicate a length of PVR_assist_information excluding the data_field_tag field and the data_field_length field.

The PVR_assist_temporal_id_plus1 field may indicate a temporal id of a picture. Actually, a temporal id may have a value obtained by subtracting 1 from a value of this field. This field may have a minimum value of 1 and a maximum value of 7. For a HEVC stream, this field may have a value equal to a value of nuh_temporal_id_plus1.

The PVR_assist_temporal_id_info_present_flag field may have a value of 1 in a case in which the PVR_assist_max_temporal_id_plus1 field exists. This field may be provided in only pictures corresponding to RAP pictures.

The PVR_assist_intra_picture_flag field may have a value of 1 in a case in which a current access unit is an intra picture.

The PVR_assist_max_temporal_id_plus1 field may indicate a maximum temporal id. Actually, the maximum temporal id may indicate a value obtained by subtracting 1 from a value of this field. This field may have a value of 1 to 7.

The PVR_assist_PB_numbers_in_temporalId_zero field may indicate the number of frames, existing between intra frames, different from the intra frames in a base sub-layer having a temporal id of 0. This field may be used to estimate speed of a trick play.

The PVR_assist_reserved_0 field is a field reserved for future use.

The PVR_assist_reserved_byte field may indicate a field reserved for future use.

Figure 39:
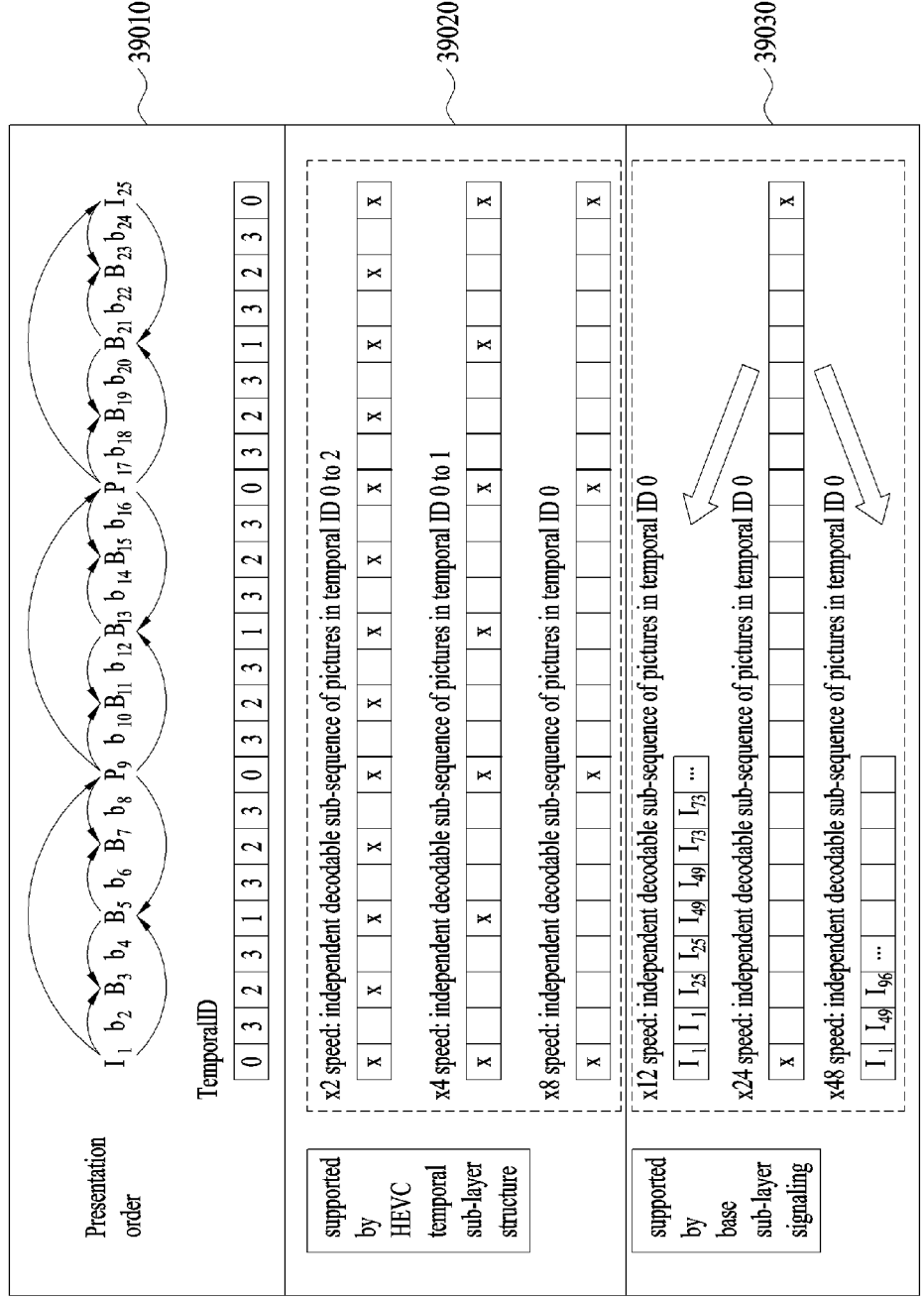
FIG. 39 is a view showing a trick play method using an HEVC temporal sub-layer according to an embodiment of the present invention.

FIG. 39 is a view showing a trick play method using an HEVC temporal sub-layer according to an embodiment of the present invention.

A first figure part 39010 of this figure shows that pictures corresponding to one GOP are arranged in presentation order. In the first figure part, I may indicate I pictures, B may indicate B pictures, and P may indicate P pictures. In addition, numerical subscripts of the alphabet indicating picture types may indicate presentation order. In the first figure part, arrows may indicate reference relationship among pictures.

A second figure part 39020 of this figure shows a method of providing a trick play using an HEVC temporal sub-layer according to an embodiment of the present invention. One quadrilateral box may indicate one picture. A number in each quadrilateral box may indicate a temporal id. Symbol x shown in each quadrilateral box may indicate a picture decoded and presented during execution of a trick play. As shown in the second figure part, X2 to X8 speed trick plays may be provided by the HEVC temporal sub-layer.

A third figure part 39030 of this figure shows a method of providing a trick play using base sub-layer signaling according to an embodiment of the present invention. An embodiment of the present invention may decode and present only intra pictures to provide X12, X24, and X48 speed trick plays.

Figure 40:
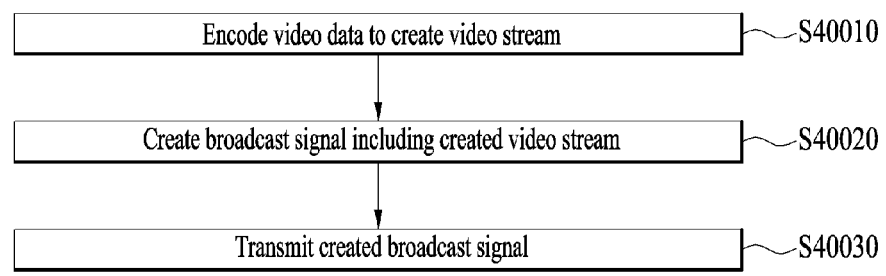
FIG. 40 is a view showing a broadcast signal transmission method according to an embodiment of the present invention.

FIG. 40 is a view showing a broadcast signal transmission method according to an embodiment of the present invention.

An embodiment of the present invention may transmit a broadcast signal through the following procedures. First, an embodiment of the present invention may encode video data so as to create a video stream (S40010). The video stream may be encoded using an AVC or HEVC codec. The video stream may include PVR assist information having a maximum temporal identification information value of the video stream. The maximum temporal identification information may be named max_temporal_id or PVR_assist_max_temporal_id. The maximum temporal identification information has been previously described in detail with reference to FIGS. 30, 33, 34, 35, and 38. The PVR assist information may mean information that is necessary for a receiver or a PVR apparatus in order to execute a trick play of video data. The PVR assist information has been previously described in detail with reference to FIG. 34. Next, an embodiment of the present invention may create a broadcast signal including the created video stream (S40020). The video stream may mean a video unit stream, a PES stream having a packetized video unit stream, or a transport stream having a TS packet. The created video stream may be modulated using various modulation methods in order to create a broadcast signal. Next, an embodiment of the present invention may transmit the created broadcast signal (S40030). An embodiment of the present invention may transmit a created broadcast signal through at least one selected from among a terrestrial broadcasting network, a cable network, and an Internet network.

According to another embodiment of the present invention, a video stream may include an adaptation field, and the adaptation field may include PVR assist information. The adaptation field, which is a field existing between a header and a payload of a TS packet, may include data. A video stream according to an embodiment of the present invention may be a stream including several TS packets. Consequently, a video stream according to an embodiment of the present invention may include an adaptation field.

According to another embodiment of the present invention, an adaptation field may include a private data byte field, and the private data byte field may include PVR assist information. The private data byte field may be included in the adaptation field, and may include several data fields. One of the above-described several data fields may include PVR assist information.

According to another embodiment of the present invention, a video stream may include one or more temporal sub-layers and each temporal sub-layer may indicate a group of pictures. A NAL unit header including encoded video data according to an embodiment of the present invention may include temporal identification plus information. The temporal identification plus information may indicate a value obtained by adding 1 to a value of temporal identification information and the temporal identification information may include information for identifying a temporal sub-layer. Temporal identification plus information according to an embodiment of the present invention may be used to identify a temporal sub-layer. The temporal sub-layer may be named a temporal sub-layer, the temporal identification information may be named a temporal id, and the temporal identification plus information may be named nuh_temporal_id_plus1.

According to another embodiment of the present invention, PVR assist information may include maximum temporal identification information indicating a maximum temporal identification information value of a video stream. A video stream encoded by HEVC may have several temporal sub-layers and each temporal sub-layer may be identified by temporal identification information. Maximum temporal identification information according to an embodiment of the present invention may mean temporal identification information of a temporal sub-layer having maximum temporal identification information among several temporal sub-layers.

According to another embodiment of the present invention, maximum temporal identification information may have a value of any integer selected from among 0 to 6. According to another embodiment of the present invention, therefore, a temporal identification information value may match with a tier number within a conventionally defined range of the tier number in a case in which the temporal identification information value matches with the tier number one to one. Conventionally, the tier number is defined from 0 to 7.

According to another embodiment of the present invention, maximum temporal identification information may be used to provide information regarding speed of a trick play. The maximum temporal identification information may signal information regarding the maximum X speed of a trick play. An embodiment of the present invention may signal an X speed of a trick play corresponding to each piece of temporal identification information. An embodiment of the present invention may inform a user of information regarding a serviceable maximum X speed by signaling the maximum temporal identification information, set the X speed of the trick play according to a request of the user, and provide the trick play at the set X speed to the user, which has been previously described in detail with reference to FIGS. 33 and 38.

According to another embodiment of the present invention, PVR assist information may include temporal identification flag information indicating whether maximum temporal identification information is included. The temporal identification flag information may be provided for at least every RAP. The temporal identification flag information may be named PVR_assist_temporal_id_info_present_flag. The temporal identification flag information may have a value of 1 in a case in which the maximum temporal identification information is included in the PVR assist information. For an AVC stream, the temporal identification flag information may have a value of 0. An embodiment of the present invention may signal maximum temporal identification information every RAP since temporal identification flag information is provided for every RAP. Consequently, an embodiment of the present invention may signal maximum X speed information of a trick play every RAP, which has been previously described in detail with reference to FIGS. 32 and 38.

Figure 41:
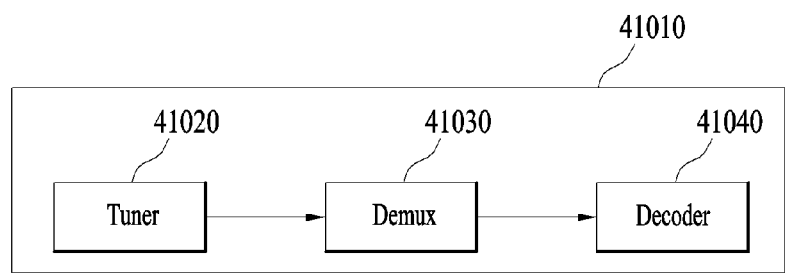
FIG. 41 is a view showing the structure of a broadcast signal receiving apparatus according to an embodiment of the present invention.

FIG. 41 is a view showing the structure of a broadcast signal receiving apparatus according to an embodiment of the present invention.

A broadcast signal receiving apparatus 41010 according to an embodiment of the present invention may include a tuner 41020, a demux 41030, and/or a decoder 41040.

The tuner may receive a broadcast signal.

The demux may demultiplex the received broadcast signal to extract a video stream. The video stream may include PVR assist information having a maximum temporal identification information value of the video stream.

The decoder may decode the extracted video stream based on the PVR assist information, and may execute a trick play of video data.

Components of a broadcast signal receiving apparatus according to an embodiment of the present invention shown in this figure having the same names as those of the broadcast signal receiving apparatus shown in FIG. 36 may perform the same functions as those of the broadcast signal receiving apparatus shown in FIG. 36.

Components of a broadcast signal receiving apparatus according to an embodiment of the present invention shown in this figure corresponding to the procedures of the broadcast signal transmission method shown in FIG. 40 may perform functions corresponding to the procedures of the broadcast signal transmission method shown in FIG. 40.

Hereinafter, an embodiment that is capable of efficiently executing a trick play at a video data level in addition to the above PES level for signal transmission will be disclosed.

In the disclosed embodiment, it is possible to transmit and receive information regarding a trick play so as to efficiently execute a video trick play at a video transmission step.

Separately from the disclosed embodiment or in addition to the disclosed embodiment, in a case in which information regarding a trick play signaled in advance at the video data level, the video decoder may obtain the information regarding the trick play, and may efficiently execute the trick play.

Hereinafter, embodiments of the present invention will be described in detail with reference to the drawings.

Figure 42:
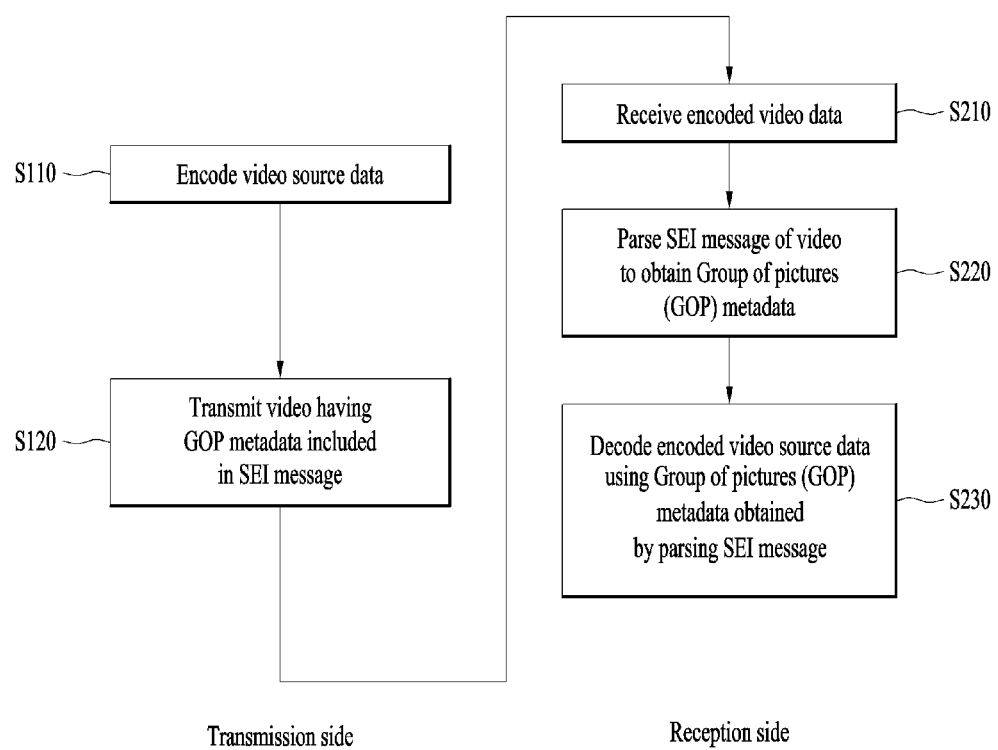
FIG. 42 is a view showing an embodiment of a signal transmission/reception method according to the present invention.

FIG. 42 is a view showing an embodiment of a signal transmission/reception method according to the present invention.

Video source data are encoded (S110).

Video source data may be encoded using AVC or HEVC.

For example, a video stream encoded using HEVC may include an Supplemental Enhancement Information (SEI) message having picture information of video data.

For a trick play of the HEVC-encoded video data stream, the SEI message of the HEVC video data may include Group of pictures (GOP) metadata. The HEVC video data may transmit VCL data (video coding layer (VCL) NAL unit) including a coding slice segment Network Abstraction Layer (NAL) unit or a sub unit thereof. In a case in which the SEI message includes GOP metadata, information regarding a picture before the VCL data may be signaled, whereby a trick play is efficiently executed.

The GOP metadata in the SEI message may include the total number of GOPs, the size of the GOP, the picture type of each picture constituting the GOP, a temporal ID, and the picture type of a temporal sub-layer.

A video having GOP metadata included in the SEI message is transmitted (S120).

The transmitted video data may be received and played using the following method.

The encoded video data are received (S210).

The SEI message of the received video is parsed to obtain Group of pictures (GOP) metadata (S220). In this case, the total number of GOPs, the size of the GOP, the picture type of each picture constituting the GOP, the temporal ID, and the picture type of the temporal sub-layer may be obtained from the Group of pictures (GOP) metadata of the SEI message of the video.

The encoded video source data are decoded using the Group of pictures (GOP) metadata obtained by parsing the SEI message (S230). In this case, pictures of the video source data may be filtered using the Group of pictures (GOP) metadata obtained by parsing the SEI message, and a trick play may be executed using the filtered pictures. In a case in which picture information of the Group of pictures (GOP) metadata included in the SEI message of the video and pointers (or video indexes) of the pictures of the encoded video data are used, a trick play may be efficiently executed. That is, the video decoder may decode pictures, filtered using the picture pointers of the video source, using metadata, obtained by the video parser upon parsing the SEI message. Consequently, it is possible to efficiently execute a trick play.

Figure 43:
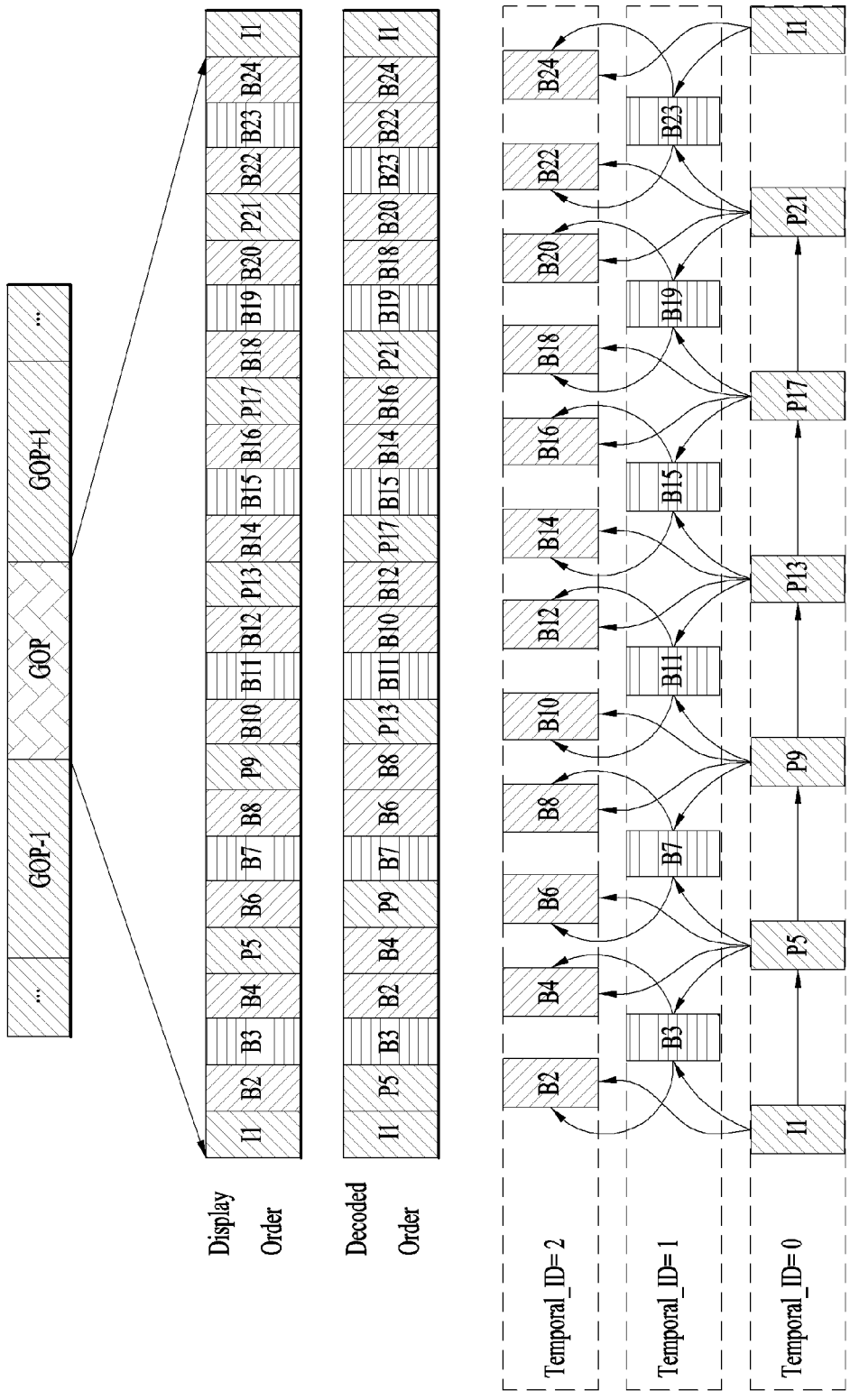
FIG. 43 is a view showing the structure of a Group of pictures (GOP) in a case in which video data are encoded in accordance with an embodiment of the present invention.

FIG. 43 is a view showing the structure of a Group of pictures (GOP) in a case in which video data are encoded in accordance with an embodiment of the present invention. An embodiment of the present invention will be described with reference to this figure.

In a case in which video source data are encoded and output, video data may be transmitted in units of GOP.

This example is an example of video data transmitted in units of GOP. GOP−1, GOP, and GOP+1, which are shown at the uppermost level of this figure, indicate that GOPS are transmitted in temporal order. In this figure, the maximum temporal_id of a NAL unit header is 2, and the size of the GOP is 24.

A GOP indicates a group of one or more types of pictures. A GOP may include several picture types, such as I, P, and B.

In this figure, the picture type and display order are indicated in the GOP. For example, pictures are display in the order of I1, B2, B3, B4, P5, B6, B7, P9, B10, B11, B12 . . . .

Due to reference relationship of video encoding, however, decoding is performed in the GOP in the order of I1, P5, B3, B2, B4, P9, B7, B6 . . . , which is different from the display order.

In a case in which a coded slice segment is included in an intra random access point (IRAP) picture, Temporal_Id has a value of 0. In this example, Temporal_Id of I1, P5, P9, P13, P17, and P21 has a value of 0.

B3, B7, B11, B15, B19, and B23 are pictures that use pictures having Temporal_Id of 0 in decoding order. Temporal_Id has a value of 1.

B2, B4, B6, B8, B10, B12, B14, B16, B18, B20, B22, and B24 are pictures that use pictures having Temporal_Id of 0 and 1 in decoding order. Temporal_Id has a value of 2.

In an embodiment of the present invention, each picture constituting the GOP may include a temporal ID, a picture type, temporal_sub_layer_picture_type, and a dependency level. The total number of GOPs constituting a video stream and information of each picture of the GOP may be signaled first through an SEI message, which will be described hereinafter in detail.

FIG. 44 is a view showing an example of syntax of video data transmitted and received in accordance with an embodiment of the present invention.

An SEI message of video data encoded in accordance with an embodiment of the present invention, particularly video data encoded using HEVC, may include metadata information of a GOP.

For example, in a case in which payloadType of the SEI message is specific payloadType (payloadType==xxx), the SEI message may include GOP metadata information (trickplay_service_GOP_metadata_info (payloadSize)) for a trick play service. This information may be included in an SEI raw byte sequence payload (RBSP) of the SEI message.

In a case in which, when an HEVC NAL unit of the video data is parsed, a value of nal_unit_type is a value corresponding to the SEI data and payloadType is a specific value, the video parser in the decoder of the receiver may obtain GOP metadata information (trickplay_service_GOP_metadata_info) for a trick play service. At this time, payloadType may have an integer value greater than 0.

The video parser in the decoder of the receiver may decode GOP metadata information (trickplay_service_GOP_metadata_info) for a trick play service to obtain GOP metadata information for a trick play of video data.

The receiver may obtain GOP metadata information for a trick play using this information in advance before decoding raw data of the video data in order to efficiently execute a trick play.

GOP metadata information for a trick play may include the following information.

A GOP_total_count field indicates the total number of GOPs constituting a stream.

A GOP_size field indicates the total number of pictures of a GOP.

A max_temporal_ID field indicates the maximum temporal_id value included in a video stream.

A temporal_ID field may have the same value as temporal ID (temporalId=nuh_temporal_id_plus1?1) calculated using nuh_temporal_id_plus1 defined in the HEVC standards.

For example, in a case in which nal_unit_type is 16 to 23, i.e. a random access picture (RAP) in HEVC standards, TemporalId may have a value of 0. In a case in which nal_unit_type is TSA (temporal sub-layer access (TSA) picture)_R, TSA_N, STSA (step-wise temporal sub-layer access (STSA) picture)_R, or STSA_N, TemporalId may have a value other than 0.

A picture_type field may select some nal_unit_type values that can be used for a trick play from among NAL_unit_type values of HEVC, and may configure the selected nal_unit_type as pic_type, which will be described hereinafter.

A temporal_sub_layer_pic_type field indicates temporal_sub_layer_pic_type that can be adaptively changed from among pictures having an temporal ID of 1 or more. This information indicates a temporal sublayer picture type field, a detailed example of which will be described hereinafter.

A dependency_level field indicates information indicating a dependency level of each picture in a GOP. For example, in a case in which a dependency_level field is 0x00, it indicates that the dependency level of this video sample is unknown.

In a case in which dependency_level field is 0x01 to 0x3E, it indicates that this sample does not depend on video samples having a greater dependency_level values than this one.

For example, in a dependency_level field is 0x3F, it may be a reserved field.

A trick play operation based on the dependency_level field will be described hereinafter in detail.

FIG. 45 is a view showing picture type information that is capable of supporting a trick play of a video stream according to an embodiment of the present invention.

Picture type information (pic_type) may indicate instantaneous decoding refresh (IDR) (pic_type=0) having no related leading picture, IDR (pic_type=1) having a decodable leading picture, and broken link access (BLA) (pic_type=2) having no related leading picture, based on values of this field.

In this example, in a case in which pic_type is 4, it indicates that BLA can have related random access decodable leading (RADL) and random access skipped leading (RASL) pictures. In a case in which pic_type is 5, it indicates that clean random access (CRA) can have a related leading picture. In a case in which pic_type is 6, it may indicate a random access decodable leading picture. In a case in which pic_type is 7, it may indicate a random access skipped leading picture.

A leading picture is a picture preceding a related IRAP picture in output order. Broken link access (BLA) means that each VCL NAL unit is an IRAP picture having a value of nal_unit_type, such as BLA_W_LP, BLA_W_RADL, or BLA_N_LP. Clean random access (CRA) means that each VCL NAL unit is an IRAP picture having a value of nal_unit_type, such as CRA_NUT.

Nal_unit_type related to picture type information is shown in the rightmost column.

Figure 46:
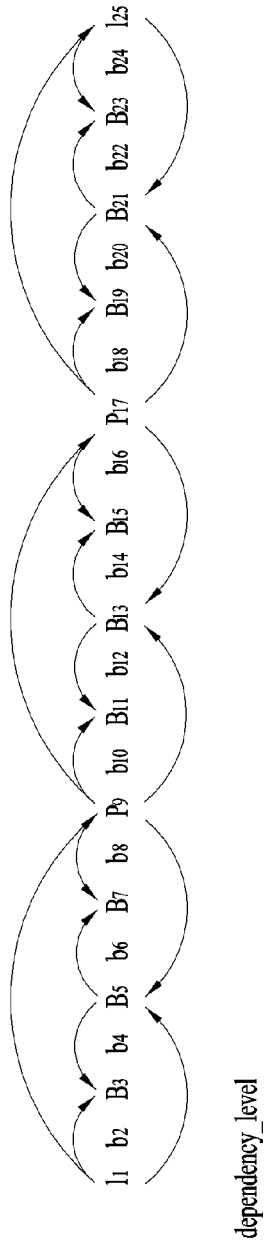
FIG. 46 is a view showing an operation example of a trick play according to a dependency_level field among metadata information of a GOP for a trick play according to an embodiment of the present invention.

FIG. 46 is a view showing an operation example of a trick play according to a dependency_level field among metadata information of a GOP for a trick play according to an embodiment of the present invention.

Assuming that pictures are arranged in order of I1, B2, B3, B4, B5, B6, B7, P9, B10, B11, B12 . . . , it indicates that dependency_level of I1 and I25 is 1, dependency_level of P5 and P17 is 2, and dependency_level of B5, B13, and B21 is 3. In addition, it indicates that dependency_level of B3, B7, B11, B15, B19, and B23 is 4, and dependency_level of B2, B4, B6, B8, B10, B12, B14, B16, B18, B20, B22, and B24 is 5.

In a case in which an X2-speed trick play is executed, pictures having dependency_level of 1, 2, 3, and 4 are used. For example, in a case in which dependency_level is 3, it means that a trick play can be executed using samples corresponding to dependency_level of 1, 2, and 3. Consequently, it is possible to distinguish between the level of a layer that must be referred to and the level of a layer that must not be referred to when executing a trick play using dependency_level.

FIG. 47 is a view showing an example of temporal sublayer picture type according to a temporal_sub_layer_pic_type field among metadata information of a GOP for a trick play according to an embodiment of the present invention.

As described, temporal sublayer picture type is information that distinguishes adaptively changeable Temporal_sub_layer_pic_type from pictures having Temporal IDs.

Sub_layer indicates a temporal scalable layer of a temporal scalable bit stream constituting VCL NAL units having a specific TemporalId value and related non-VCL NAL units.

Sub_layer reference pictures are pictures including samples that can be used for inter prediction in a process of decoding successive pictures of the same sub layer in decoding order, and sub-layer non-reference picture are pictures including samples that cannot be used for inter prediction in a process of decoding successive pictures of the same sub layer in decoding order.

In this example, in a case in which the value of the temporal sublayer picture type is 0, it indicates that the sample is a reference temporal sub-layer access (TSA) picture. The temporal sub-layer access (TSA) picture indicates a picture having each VCL NAL unit of nal_unit_type, such as TSA_R or TSA_N.

In a case in which the value of the temporal sublayer picture type is 1, it indicates that the sample is a non-reference temporal sub-layer access (TSA) picture.

In a case in which the value of the temporal sublayer picture type is 2, it indicates that the sample is a reference step-wise temporal sub-layer access (STSA) picture. The STSA picture indicates a coded picture having each VCL NAL unit of nal_unit_type, such as STSA_R or STSA_N.

In a case in which the value of temporal sublayer picture type is 3, it indicates that the sample is a non-reference step-wise temporal sub-layer access (STSA) picture.

The difference between trick plays based on temporal sublayer picture type will be described. In a layer the Temporal_ID of which is not 0, a frame rate may be dynamically changed based on Temporal Sub-layer Access (TSA) picture and Step-wise Temporal Sub-layer Access (STSA) picture. TSA and STSA may be different from each other in terms of how the frame rate can be changed or how differently the frame rate can be changed. That is, the two picture types are different from each other in terms of the number of temporal_ids that can be skipped at once, which will be described hereinafter.

FIG. 48 is a view showing an example of changing a frame rate for a trick play in a case in which the type of temporal_sub_layer_pic_type information is TSA among metadata information of a GOP for a trick play according to an embodiment of the present invention.

In this figure, T_ID indicates Temporal_ID. In a case in which temporal_sub_layer_pic_type is TSA, only streams of a layer the temporal_ID of which is 2 may be displayed at an X4 speed in a trick play, and may then be displayed at a normal speed, i.e. an X1 speed.

That is, a picture having T_ID of 1 is a TSA picture. It is possible to provide a trick play the X speed of which can be directly changed using pictures having different Temporal_IDs, as shown in this figure, in which pictures having T_ID of 2 and pictures having T_ID of 0 are connected to each other as indicated by arrows (indicated by dotted lines).

FIG. 49 is a view showing an example of changing a frame rate for a trick play in a case in which the type of temporal_sub_layer_pic_type information is STSA among metadata information of a GOP for a trick play according to an embodiment of the present invention.

In this figure, T_ID indicates Temporal_ID. In a case in which T_ID is 1, it may be an STSA picture. This figure shows a procedure of, in a case in which temporal_sub_layer_pic_type is STSA, displaying only streams of a layer the temporal_ID of which is 2 at an X4 speed as a trick play and then displaying the streams at an X1 speed (a normal speed).

It is possible to provide a trick play the X speed of which can be sequentially changed using pictures having different Temporal_IDs as shown in this figure, in which pictures having T_ID of 2 and pictures having T_ID of 1 are connected to each other as indicated by arrows (indicated by a dotted line).

In FIGS. 48 and 49, a method of providing constraints regarding changeable X speed is required. For example, it is assumed that a frame rate is 15p in a case in which temporal_id is 0, a frame rate is 30p in a case in which temporal_id is 1, and a frame rate is 60p in a case in which temporal_id is 2 (max_temporal_id=2).

In this case, in a case in which temporal_sub_layer_pic_type is TSA, direct access from a temporal_id of 0 to a temporal_id of 2 is possible. When an adaptive stream is transmitted and received, a video service having a frame rate of 15p may be provided, and then direction change to a service having a frame rate of 60p may be possible. Consequently, it is possible to more efficiently change a trick play using temporal_id and temporal_sub_layer_pic_type.

In another example, in a case in which temporal_sub_layer_pic_type is STSA, only stepwise access to pictures is possible. Consequently, access from a temporal_id of 0 to a temporal_id of 1 may be performed, and then access from a temporal_id of 1 to a temporal_id of 2 may be performed.

Consequently, change from a 15p video to a 30p video may be performed, and then change from a 30p video to a 60p video may be performed. In this way, in a layer the Temporal_ID of which is not 0, a frame rate may be dynamically changed based on Temporal Sub-layer Access (TSA) picture and Step-wise Temporal Sub-layer Access (STSA) picture.

Figure 50:
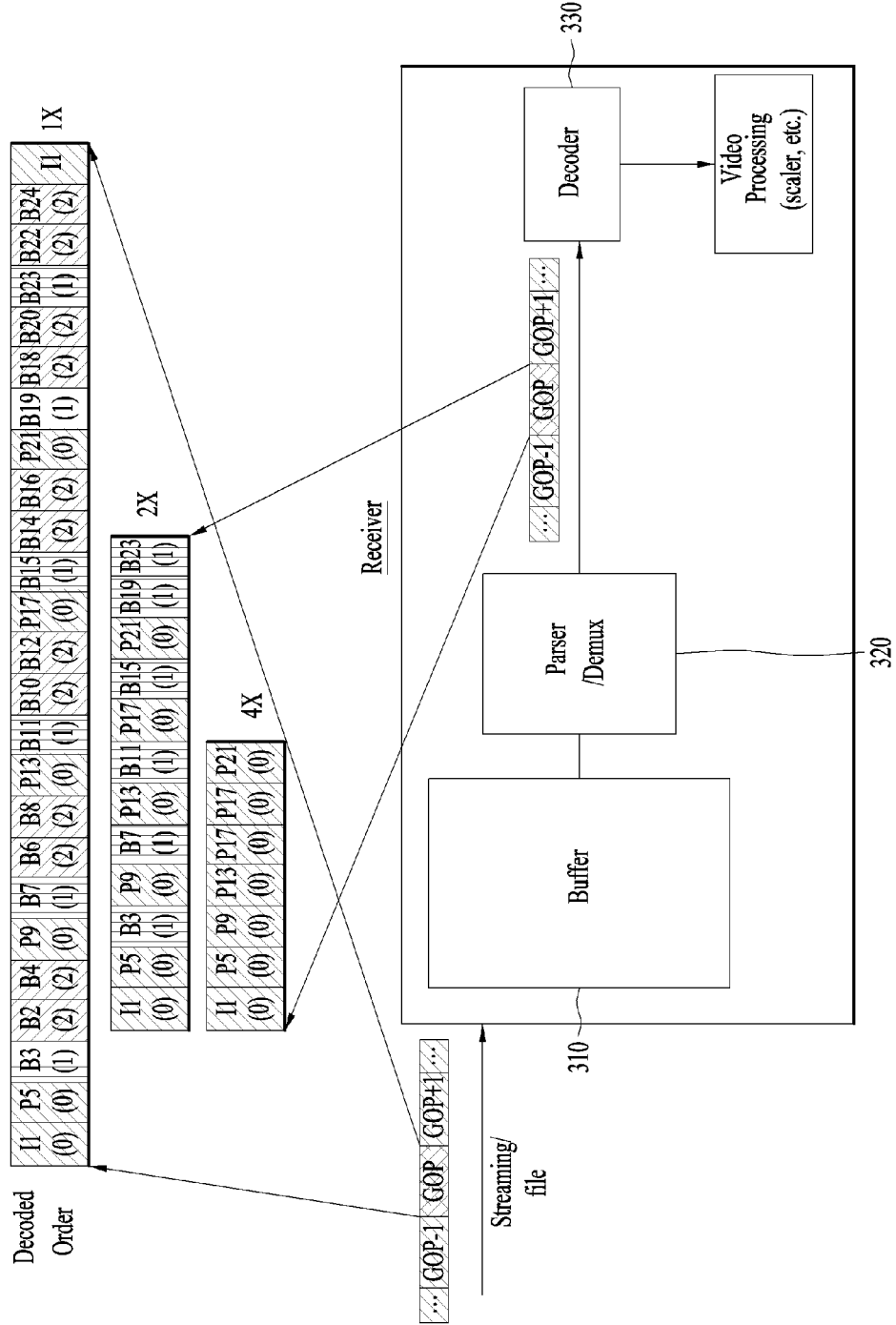
FIG. 50 is a view showing an embodiment of a signal reception device according to the present invention.

FIG. 50 is a view showing an embodiment of a signal reception device according to the present invention. Hereinafter, an embodiment of a signal reception device according to the present invention will be described with reference to this figure.

The embodiment of the signal reception device may include a decoder. The decoder may include a temporary storage unit 210, a video parser 220, and a video decoding unit 230.

The embodiment of the signal reception device may receive encoded video data. The encoded data may include pictures included in a GOP in temporal order.

The temporary storage unit 210 may function as a buffer for temporarily storing encoded video data. In this case, the type of the encoded video data may be a file or a video stream.

The video parser 220 may parse an SEI message from the encoded video data to obtain Group of pictures (GOP) metadata. As previously described, the GOP metadata may include the total number of GOPs of the video data, the size of the GOP, the picture type of each picture constituting the GOP, a temporal ID, and the picture type of a temporal sub-layer. The video parser 220 may parse an SEI message, and may transmit GOP metadata obtained from the SEI message to the video decoding unit 230.

Alternatively, the video parser 220 may filter or demultiplex pictures in a GOP using the GOP metadata, and may output the filtered or demultiplexed pictures.

The video decoding unit 230 may decode the video using the video data output by the video parser 220 such that the video can be reproduced.

The video decoding unit 230 may execute a trick play based on an index in the video data.

In this case, the video decoding unit 230 may efficiently execute a video trick play based on the Group of pictures (GOP) metadata obtained by the video parser 220, which has been previously described with reference to FIGS. 46 to 48.

For example, the video parser 220 may output pictures necessary for a trick play among picture in a GOP using the temporal ID of each picture (or a coding slice segment) in the video data, the picture type, the dependency level, and the temporal sublayer picture type. In this case, information regarding the decoding order may be obtained earlier than a case in which the video decoding unit 230 directly obtains information regarding the decoding order while decoding the video data such that the pictures can be decoded.

In this figure, pictures in a GOP of the received video data are denoted by T1, B2, B3, B4, P5, B6, B7, P9, B10, B11, B12 . . . , the temporal ID values of which are shown below in parentheses.

In a case in which the video parser 220 obtains GOP metadata from the SEI message, the video decoding unit 230 may decode the pictures in the illustrated order using the GOP metadata. As a result, the video pictures may be displayed at a normal speed, i.e. at an X1 speed.

However, in a case in which video parser 220 obtains GOP metadata from the SEI message and the video decoding unit 230 executes a trick play at an X2 speed using the GOP metadata, the video decoding unit 230 may decode the pictures in the decoding order of I1, P5, B3, P9, B7, P13, B11, P17, B15, P21, B19, and B23 to execute the trick play.

In a case in which the video decoding unit 230 executes a trick play at an X4 speed using the GOP metadata parsed by the video parser 220, the video decoding unit 230 may decode the pictures in decoding order of I5, P5, P9, P13, P17, and P21 to execute a trick play.

In another example, the video decoding unit 230 may use the temporal sublayer picture type in order to change the X speed during a trick play.

The embodiment of the signal reception device may further include a video processing unit 240. The video processing unit 240 may perform various post processing operations, such as scaling of video data decoded by the video decoding unit 240.

Consequently, the video decoding unit 230 obtains information for a trick play while decoding video source data, and obtains information necessary for a trick play in advance through an SEI message from the video parser 220, whereby it is possible for the decoder to more efficiently execute a trick play.

Figure 51:
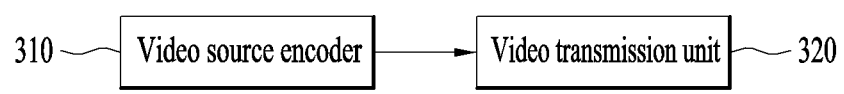
FIG. 51 is a view showing an embodiment of a signal transmission device according to the present invention.

FIG. 51 is a view showing an embodiment of a signal transmission device according to the present invention. Hereinafter, the operation of an embodiment of a signal transmission device according to the present invention will be described with reference to this figure.

The embodiment of a signal transmission device according to the present invention includes a video source encoder 310 and a video transmission unit 320.

The video source encoder 310 encodes video source data (S110). The video source encoder 310 may encode video source data using AVC or HEVC.

The video source encoder 310 may create and output a video format to be transmitted to the video transmission unit 320. For example, a video stream encoded using HEVC may include an Supplemental Enhancement Information (SEI) message having picture information of video data.

For a trick play of the HEVC-encoded video data stream, the SEI message of the HEVC video data may include Group of pictures (GOP) metadata.

The GOP metadata in the SEI message may include the total number of GOPs, the size of the GOP, the picture type of each picture constituting the GOP, a temporal ID, and the picture type of a temporal sub-layer, which has been previously described with reference to FIG. 44.

The video transmission unit 320 transmits a video having GOP metadata included in the SEI message of the HEVC video data In a case in which the video is transmitted, information at the PES level, shown in FIGS. 1 to 41, may be included in order to efficiently execute a trick play.

Consequently, it is possible for the decoder of the receiver to more efficiently execute a video trick play using the GOP metadata included in the SEI message According to an embodiment of the present invention, it is possible to transmit and receive signaling information for a trick play of a stream based on a standardized encoding scheme, such as an AVC or HEVC stream. According to an embodiment of the present invention, it is possible to provide an extendable scheme in a case in which a trick play of an encoded steam is signaled. In addition, a trick play is more efficiently executed while being compatible with a trick play scheme for HEVC-encoded content.

MODE FOR INVENTION

Various embodiments for carrying out the invention have been described in the best mode for carrying out the invention.

INDUSTRIAL APPLICABILITY

The present invention may be used extensively in the broadcasting and video signal processing industries.

The invention claimed is:
1. A signal reception method comprising:
receiving transport stream (TS) packets,
wherein the TS packets include a video stream corresponding to an Advanced Video Coding (AVC) video stream or a High Efficiency Video Coding (HEVC) video stream,
wherein the HEVC video stream comprises a number of temporal sublayers for supporting scalability, where each temporal sublayer has a temporal identifier,
wherein the TS packets include an adaptation field that includes Personal Video Recorder (PVR) assist information for a trick play,
wherein the PVR assist information includes a tier picture number element,
wherein the tier picture number element is used to indicate a tier number of the AVC video stream or derive a temporal identifier of the HEVC video stream,
wherein the PVR assist information further includes a temporal identifier flag element for indicating whether a maximum temporal identification element that indicates a maximum temporal identifier of the HEVC video stream is present in the PVR assist information, and
wherein the maximum temporal identification element is used to provide information on trick play speed supported from the HEVC video stream;
parsing the PVR assist information; and
decoding the video stream based on the PVR assist information.
2. The signal reception method according to claim 1, wherein the temporal identifier is signaled by nuh_temporal_id_plus1 in NAL unit header.
3. A signal transmission device comprising:
a video encoder configured to encode a video stream corresponding to an Advanced Video Coding (AVC) video stream or a High Efficiency Video Coding (HEVC) video stream,
wherein the HEVC video stream comprises a number of temporal sublayers for supporting scalability, where each temporal sublayer has a temporal identifier;
a processor configured to generate transport stream (TS) packets including the video stream,
wherein the TS packets include an adaptation field that includes Personal Video Recorder (PVR) assist information for a trick play,
wherein the PVR assist information includes a tier picture number element,
wherein the tier picture number element is used to indicate a tier number of the AVC video stream or derive a temporal identifier of the HEVC video stream,
wherein the PVR assist information further includes a temporal identifier flag element for indicating whether a maximum temporal identification element that indicates a maximum temporal identifier of the HEVC video stream is present in the PVR assist information, and
wherein the maximum temporal identification element is used to provide information on trick play speed supported from the HEVC video stream; and
a video transmission unit configured to transmit the video stream.
4. A signal transmission method comprising:
encoding a video stream corresponding to an Advanced Video Coding (AVC) video stream or a High Efficiency Video Coding (HEVC) video stream,
wherein the HEVC video stream comprises a number of temporal sublayers for supporting scalability, where each temporal sublayer has a temporal identifier;
generating transport stream (TS) packets including the video stream,
wherein the TS packets include an adaptation field that includes Personal Video Recorder (PVR) assist information for a trick play,
wherein the PVR assist information includes a tier picture number element, wherein the tier picture number element is used to indicate a tier number of the AVC video stream or derive a temporal identifier of the HEVC video stream, wherein the PVR assist information further includes a temporal identifier flag element for indicating whether a maximum temporal identification element that indicates a maximum temporal identifier of the HEVC video stream is present in the PVR assist information, and wherein the maximum temporal identification element is used to provide information on trick play speed supported from the HEVC video stream; and transmitting the video stream.

5. A signal reception device comprising:

a receiver configured to receive transport stream (TS) packets, wherein the TS packets include a video stream corresponding to an Advanced Video Coding (AVC) video stream or a High Efficiency Video Coding (HEVC) video stream, wherein the HEVC video stream comprises a number of temporal sublayers for supporting scalability, where each temporal sublayer has a temporal identifier, wherein the TS packets include an adaptation field that includes Personal Video Recorder (PVR) assist information for a trick play, wherein the PVR assist information includes a tier picture number element, wherein the tier picture number element is used to indicate a tier number of the AVC video stream or derive a temporal identifier of the HEVC video stream, wherein the PVR assist information further includes a temporal identifier flag element for indicating whether a maximum temporal identification element that indicates a maximum temporal identifier of the HEVC video stream is present in the PVR assist information, and wherein the maximum temporal identification element is used to provide information on trick play speed supported from the HEVC video stream;

a parser configured to parse the PVR assist information; and a video decoder configured to decode the video stream based on the PVR assist information.

* * * * *